(12) United States Patent
Park et al.

(10) Patent No.: US 12,212,446 B2
(45) Date of Patent: Jan. 28, 2025

(54) METHOD AND DEVICE FOR SETTING 2X EHT-STF SEQUENCE FOR WIDEBAND IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 17/905,105

(22) PCT Filed: Mar. 16, 2021

(86) PCT No.: PCT/KR2021/003206
§ 371 (c)(1),
(2) Date: Aug. 26, 2022

(87) PCT Pub. No.: WO2021/187854
PCT Pub. Date: Sep. 23, 2021

(65) Prior Publication Data
US 2023/0127103 A1   Apr. 27, 2023

(30) Foreign Application Priority Data

Mar. 19, 2020   (KR) .......................... 10-2020-0034038
Apr. 2, 2020   (KR) .......................... 10-2020-0040497
May 4, 2020   (KR) .......................... 10-2020-0053420

(51) Int. Cl.
*H04L 27/26* (2006.01)
*H04W 52/52* (2009.01)
*H04W 84/12* (2009.01)

(52) U.S. Cl.
CPC ......... *H04L 27/2613* (2013.01); *H04W 52/52* (2013.01); *H04W 84/12* (2013.01)

(58) Field of Classification Search
CPC .... H04L 27/2613; H04W 52/52; H04W 84/12
See application file for complete search history.

(56) References Cited

U.S. PATENT DOCUMENTS

2017/0149523 A1* 5/2017 Li .......................... H04L 5/0037
2018/0176063 A1   6/2018 Porat et al.
(Continued)

FOREIGN PATENT DOCUMENTS

EP        3829124        6/2021
JP        2023-529602    7/2023
(Continued)

OTHER PUBLICATIONS

European Patent Office Application Serial No. 21770590.4, Search Report dated May 15, 2023, 8 pages.
(Continued)

*Primary Examiner* — Mohammad S Anwar
(74) *Attorney, Agent, or Firm* — LEE, HONG, DEGERMAN, KANG & WAIMEY

(57) ABSTRACT

Proposed are a method and device for receiving a PPDU in a wireless LAN system. Specifically, a reception STA receives the PPDU from a transmission STA through a wideband and decodes the PPDU. The PPDU includes an STF signal. The STF signal is generated on the basis of a first STF sequence for the wideband. When the wideband is a 320 MHz band, the first STF sequence is a sequence including a M sequence and is defined as {M −1 M −1 −M −1 M 0 −M 1 M 1 −M 1 −M 0 M −1 M −1 −M −1 M 0 −M 1 M 1 −M 0 M −1 −M −1 M −1 M 0 −M 1 −M 1 M 1 −M 0 M −1 −M −1 M −1 M}*(1+j)/sqrt(2).

15 Claims, 25 Drawing Sheets receiving, by a receiving station (STA), a Physical Protocol Data Unit (PPDU) through a broadband from a transmitting STA — S2510 decoding, by the receiving STA, the PPDU, wherein the PPDU includes a Short Training Field (STF) signal, wherein the STF signal is generated based on a first STF sequence for the broadband, wherein when the broadband is a 320MHz band, the first STF sequence is a sequence including an M sequence and is defined as follows:
{M −1 M −1 −M −1 M 0 −M 1 M 1 −M 1 −M 0 M −1 −M −1 M 0 −M 1 M 1 −M 0 −M 1 −M 1 M 1 −M 0 M −1 −M −1 M 0 −M 1 −M 1 M 1 −M 0 M −1 −M −1 M −1}
M} * (1+j) / sqrt(2), wherein sqrt() denotes a square root, wherein the M sequence is defined as follows:
M={-1, -1, -1, 1, 1, 1, -1, 1, 1, 1, -1, 1, 1, -1, 1}, and wherein an element having a tone index of -8, +8, -1016, +1016, -1032, +1032, -2040, +2040 in the first STF sequence is configured to 0 — S2520

(56) References Cited

U.S. PATENT DOCUMENTS

2019/0053240 A1    2/2019  Park et al.
2019/0289612 A1*   9/2019  Chen .................. H04L 27/2613

FOREIGN PATENT DOCUMENTS

| KR | 2018-0083434 | 7/2018 |
| WO | 2019-132391 | 7/2019 |
| WO | 2019-240441 | 12/2019 |
| WO | 2020-020026 | 1/2020 |

OTHER PUBLICATIONS

PCT International Application No. PCT/KR2021/003206, International Search Report dated Jun. 28, 2021, 4 page.
Chen et al., "320 MHz Channelization and Tone Plan," IEEE 802.11-19/0797r0, May 2019, 12 pages.
Liu et al., "On RU/Segment Parser and Tone Interleaver for 11be," IEEE 802.11-20/0440r0, Mar. 2020, 29 pages.
Korean Intellectual Property Office Application No. 10-2022-7029472 Office Action dated Feb. 26, 2024, 7 pages.
Park et al., "HE-STF Sequences for 160/80+80MHz," IEEE 802.11-16/0335r0, Mar. 2016, 21 pages.
The State Intellectual Property Office of the People's Republic of China Application Serial No. 202180021673.3, Office Action dated Jul. 19, 2023, 8 pages.
Japan Patent Office Application No. 2022-555829, Office Action dated Sep. 5, 2023, 4 pages.
Park et al., "Phase Rotation Proposal," IEEE 802.11-20/0406r0, Mar. 2020, 7 pages.
Lin, "Efficient EHT Preamble Design," IEEE 802.11-20/0439r0, Mar. 2020, 6 pages.

* cited by examiner

FIG. 1
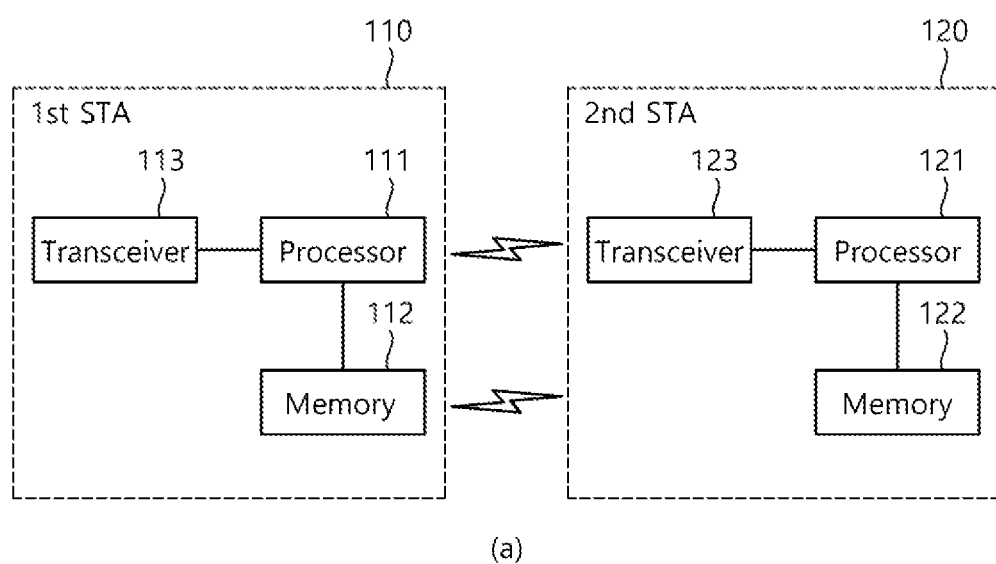
(a)
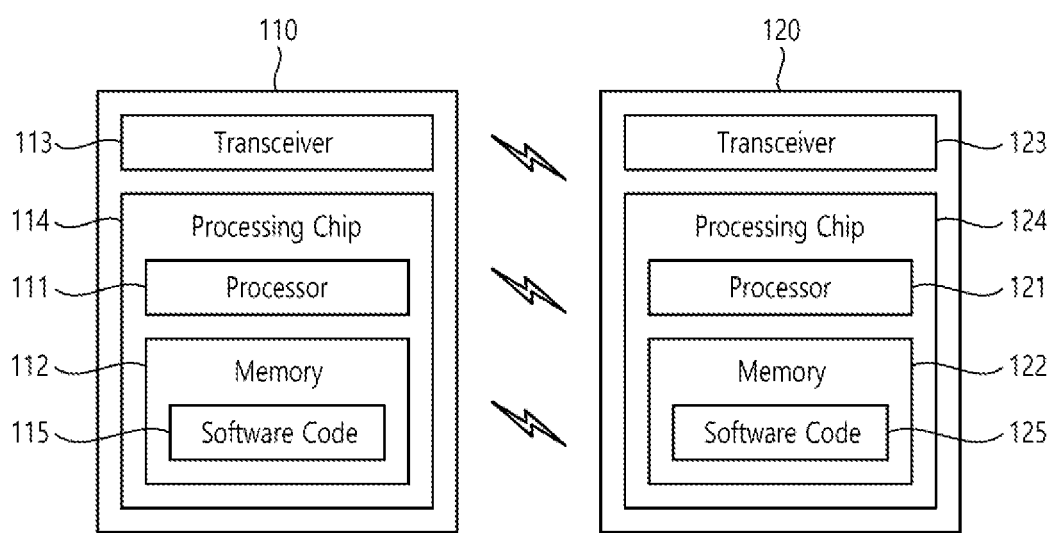
(b)

FIG. 2
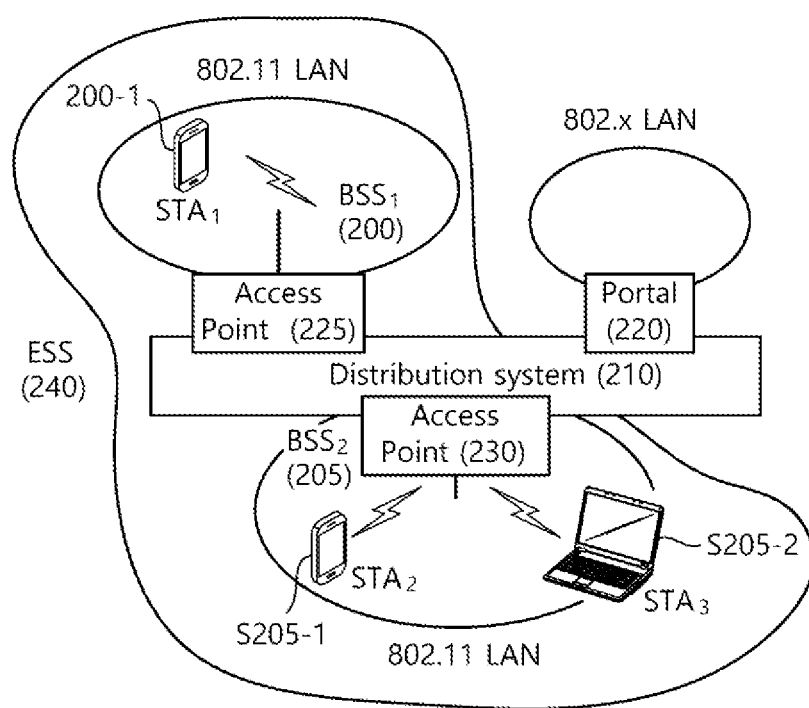
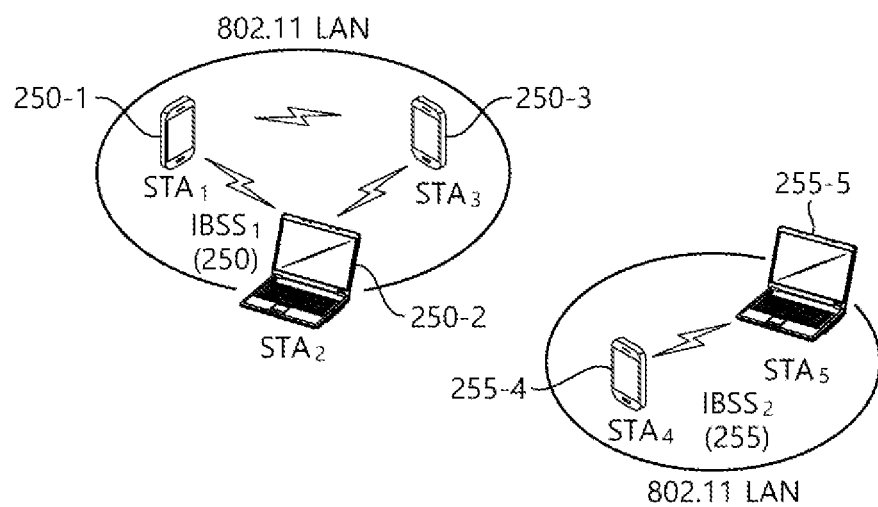

FIG. 4
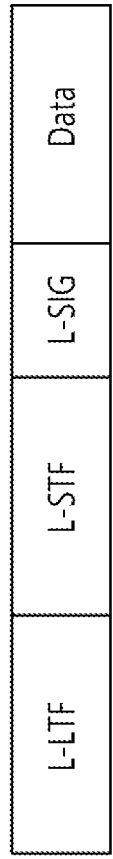
PPDU Format (IEEE 802.11a/g)
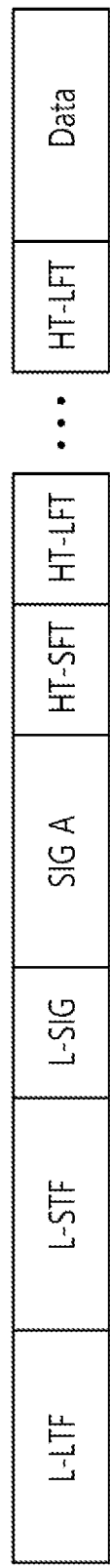
HT PPDU Format (IEEE 802.11n)
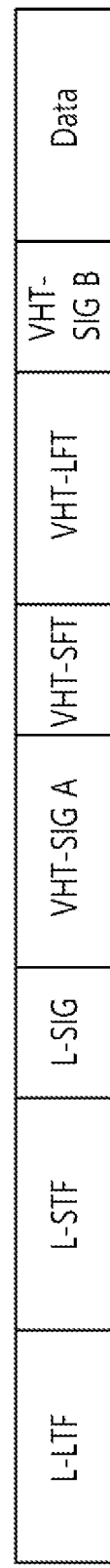
VHT PPDU Format (IEEE 802.11ac)
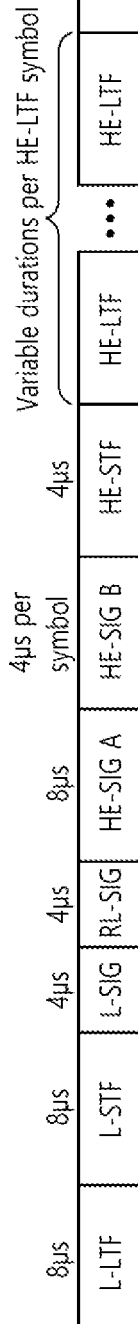

FIG. 18

| L-STF | L-LTF | L-SIG | RL-SIG | U-SIG | EHT-SIG | EHT-STF | EHT-LTF | Data |

METHOD AND DEVICE FOR SETTING 2X EHT-STF SEQUENCE FOR WIDEBAND IN WIRELESS LAN SYSTEM

CROSS-REFERENCE TO RELATED APPLICATION(S)

This application is the National Stage filing under 35 U.S.C. 371 of International Application No. PCT/KR2021/003206, filed on Mar. 16, 2021, which claims the benefit of earlier filing date and right of priority to Korean Application Nos. 10-2020-0034038, filed on Mar. 19, 2020, 10-2020-0040497, filed on Apr. 2, 2020, and 10-2020-0053420, filed on May 4, 2020, the contents of which are all hereby incorporated by reference herein in their entireties.

TECHNICAL FIELD

The present specification relates to a technique for receiving a PPDU through a broadband in a WLAN system, and more particularly, a method and apparatus for proposing an STF sequence capable of obtaining an optimized PAPR in consideration of an RU or MRU.

RELATED ART

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

An increased number of spatial streams may be used in the new wireless LAN standard. In this case, in order to properly use the increased number of spatial streams, a signaling technique in the WLAN system may need to be improved.

SUMMARY

Technical Objectives

The present specification proposes a method and apparatus for configuring a 2×EHT-STF sequence for a broadband in a WLAN system.

Technical Solutions

An example of the present specification proposes a method for receiving a PPDU through a broadband.

The present embodiment may be performed in a network environment in which a next-generation wireless LAN system (IEEE 802.11be or EHT wireless LAN system) is supported. The next-generation wireless LAN system may be a wireless LAN system improved from the 802.11ax system, and may satisfy backward compatibility with the 802.11ax system.

This embodiment proposes a method of configuring a 2×STF sequence mapped to an RU or a multi-RU (MRU) when a TB PPDU is transmitted through a wideband (240 MHz or 320 MHz).

A receiving station (STA) receives a Physical Protocol Data Unit (PPDU) from a transmitting STA through a broadband.

The receiving STA decodes the PPDU.

The PPDU includes a Short Training Field (STF) signal.

The STF signal is generated based on a first STF sequence for the broadband.

When the broadband is a 320 MHz band, the first STF sequence is a sequence including an M sequence and is defined as follows.

{M −1 M −1 −M −1 M 0 −M 1 M 1 −M 1 −M 0 M −1 M −1 −M −1 M 0 −M 1 M 1 −M 0 −M 1 −M 1 M 1 −M 0 M −1 −M −1 M 0 −M 1 −M 1 M 1 −M 0 M −1 −M −1 M −1 M}*(1+j)/sqrt(2)

In the case, sqrt( ) denotes a square root.

The M sequence is defined as follows. The M sequence is the same as an M sequence defined in the 802.11ax wireless LAN system.

M={−1, −1, −1, 1, 1, 1, −1, 1, 1, 1, −1, 1, 1, −1, 1}

Technical Effects

According to the embodiment proposed in the present specification, there is a new effect that an optimized PAPR can be obtained by proposing an EHT-STF sequence in consideration of various RUs or MRUs defined in the 802.11be WLAN system when a TB PPDU is transmitted through a broadband. Accordingly, there is an effect that subcarrier efficiency and effective automatic gain control (AGC) can be estimated.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

DETAILED DESCRIPTION

Figure 3:
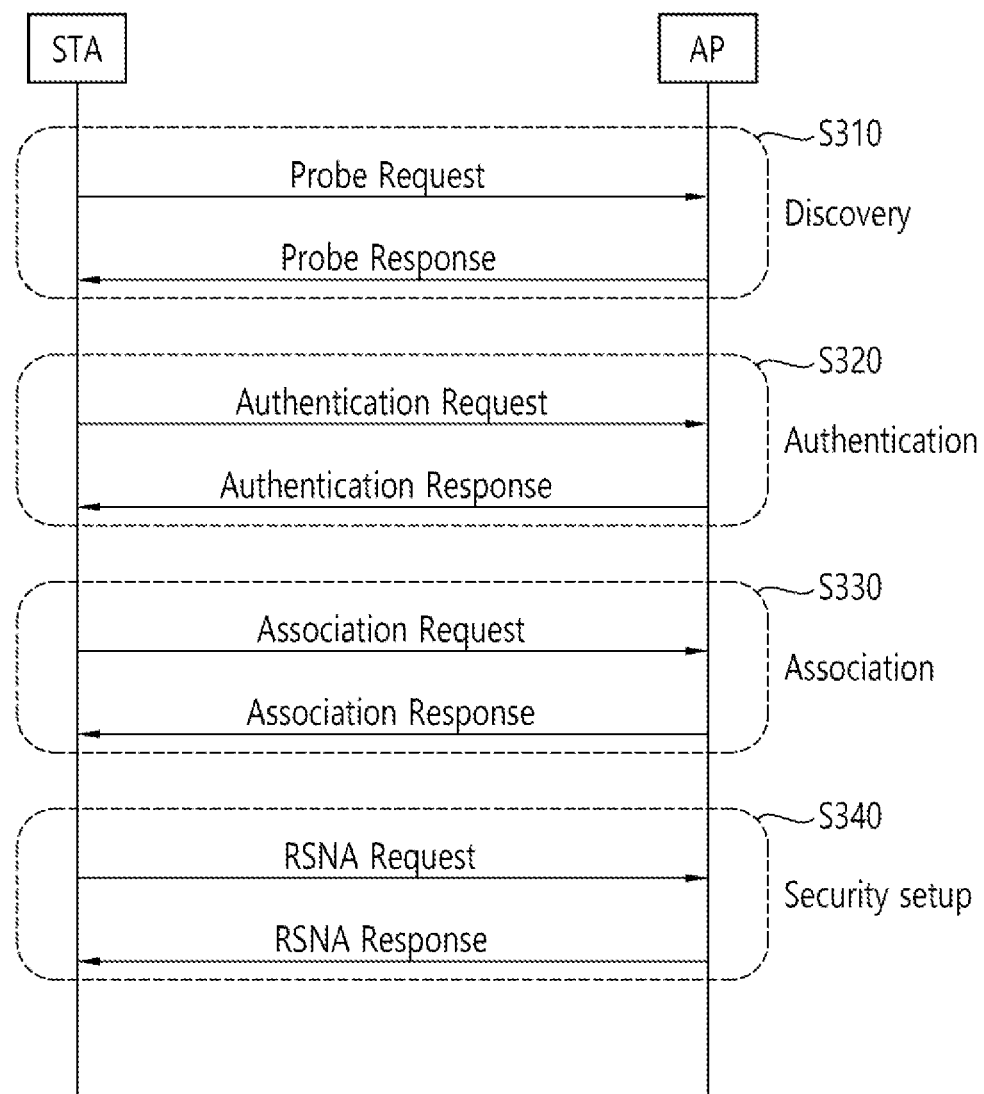
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
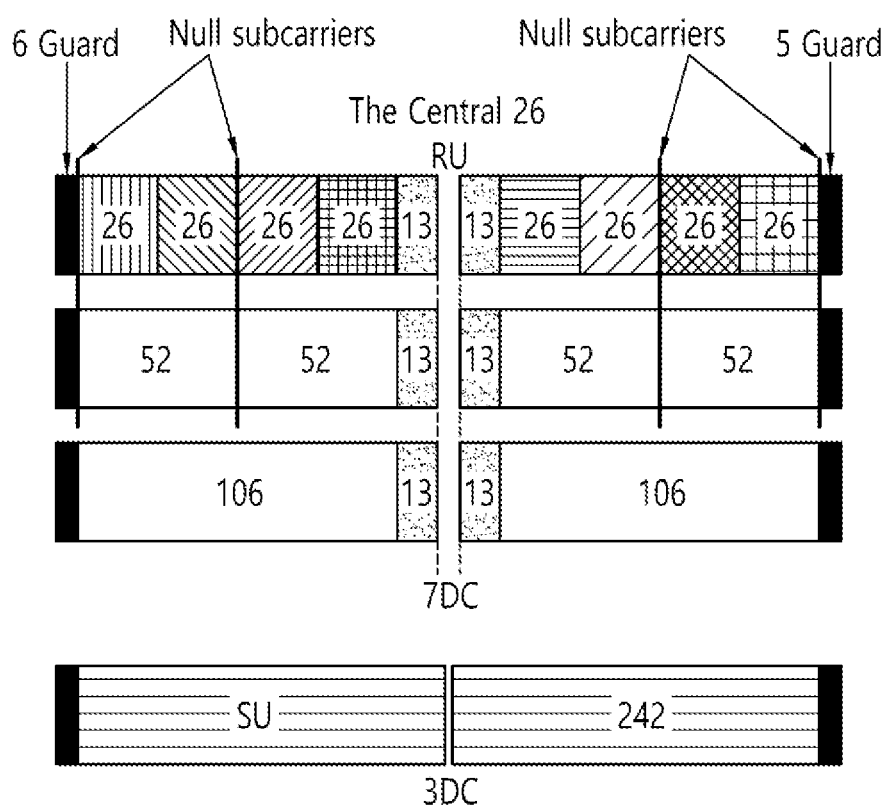
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
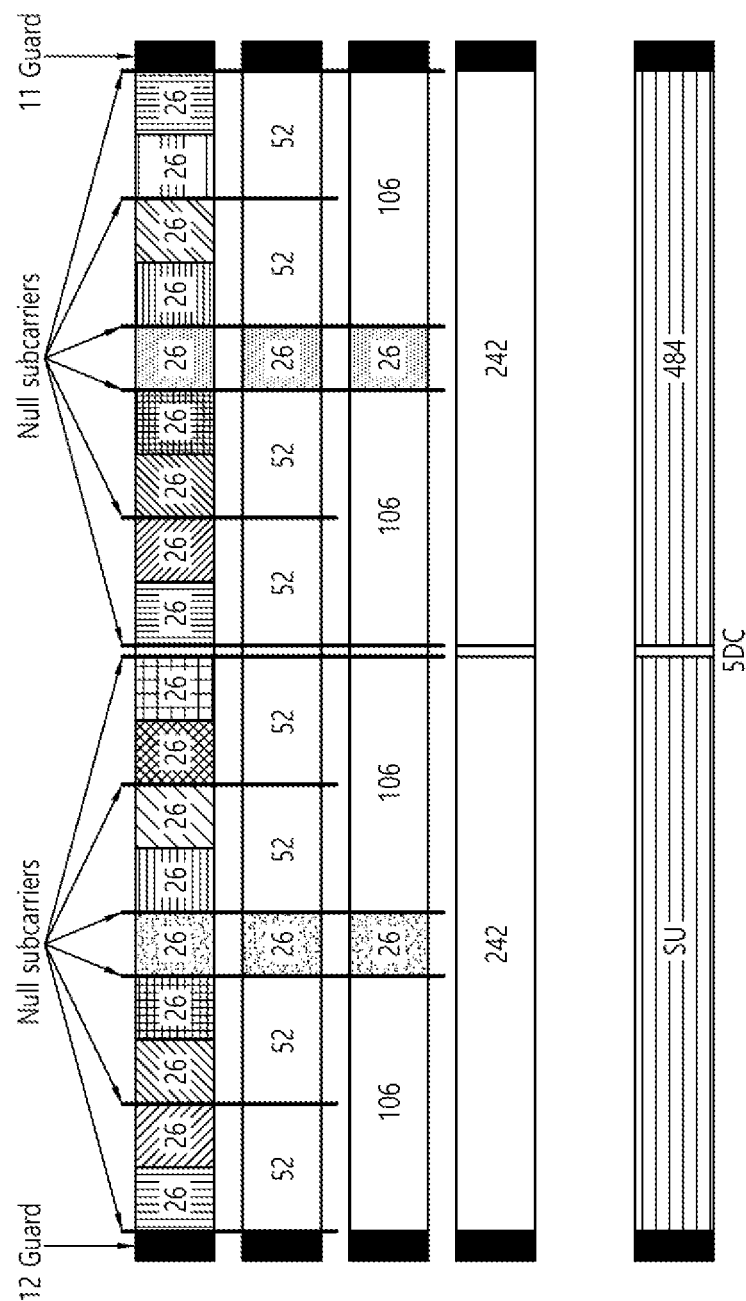
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
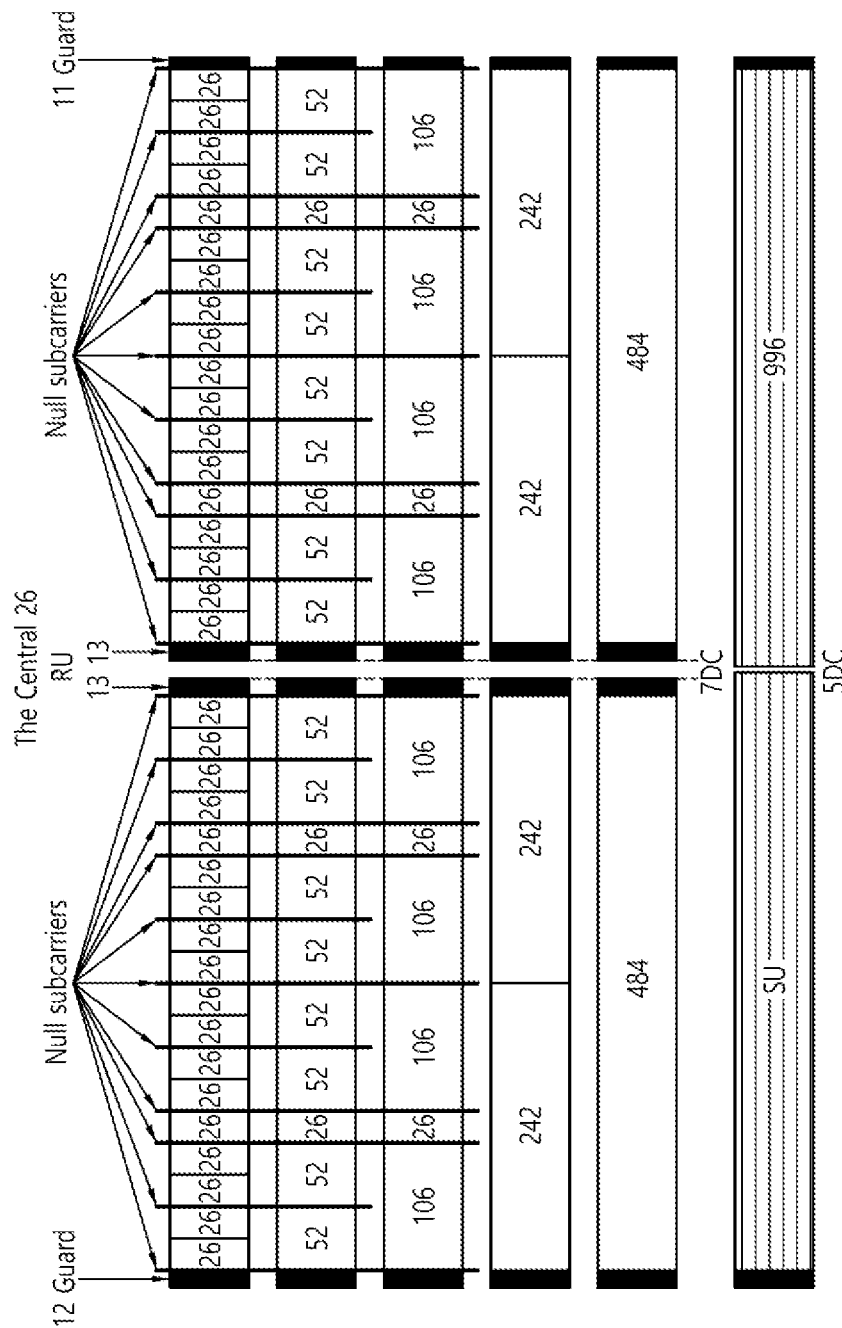
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
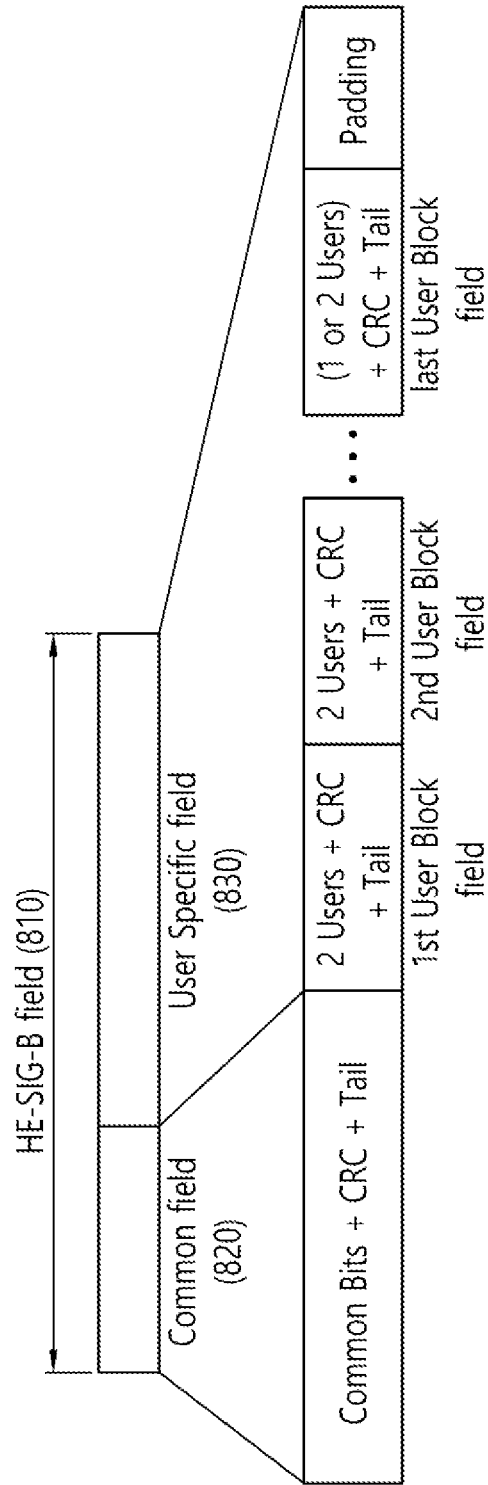
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
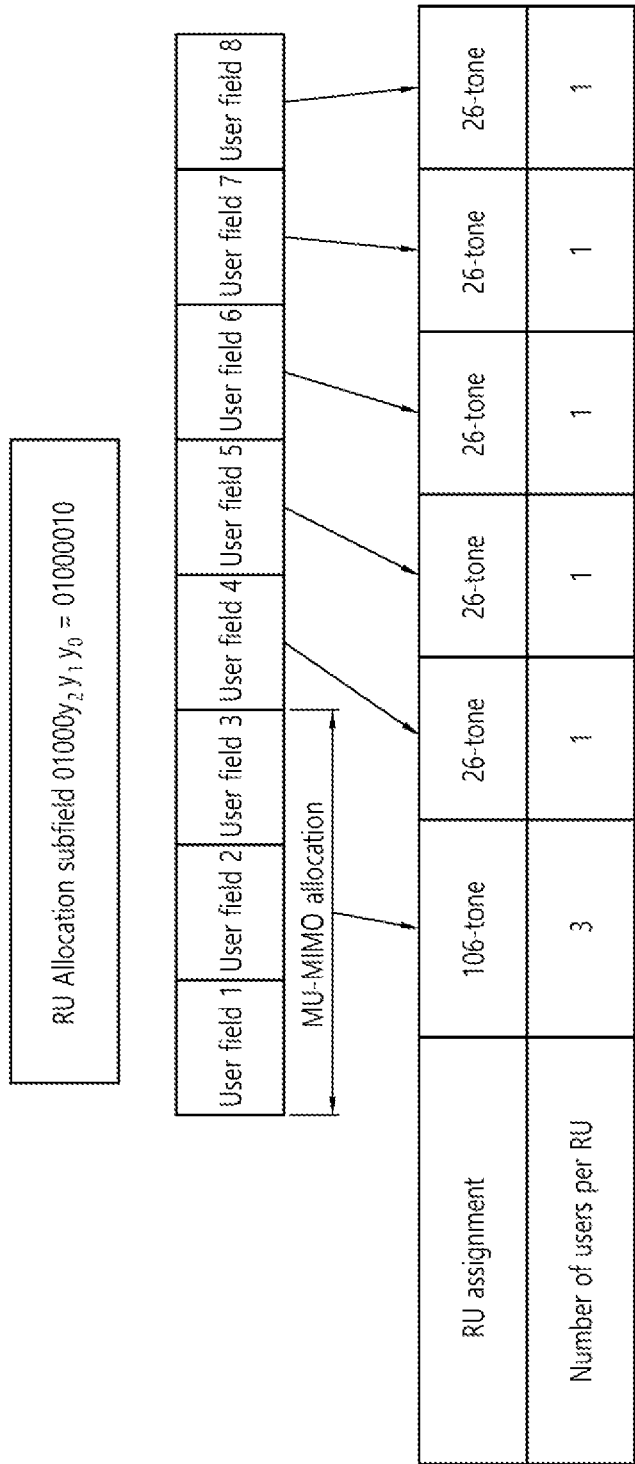
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15–18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
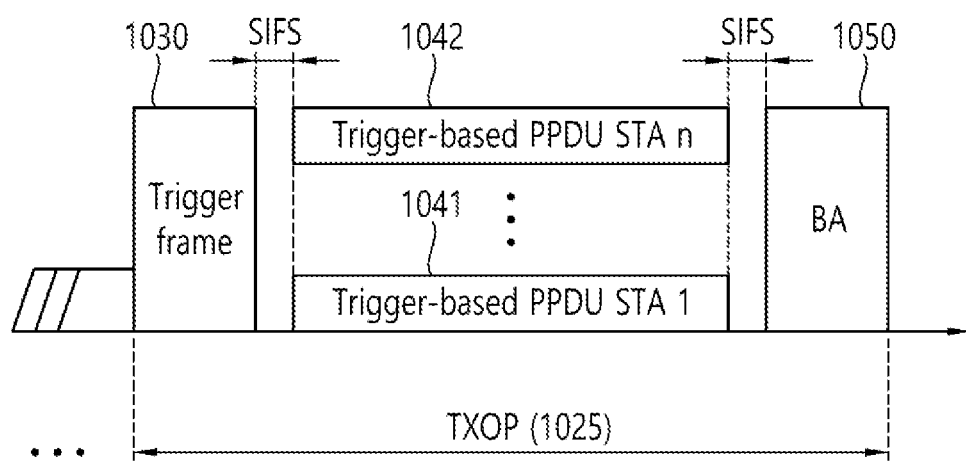
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
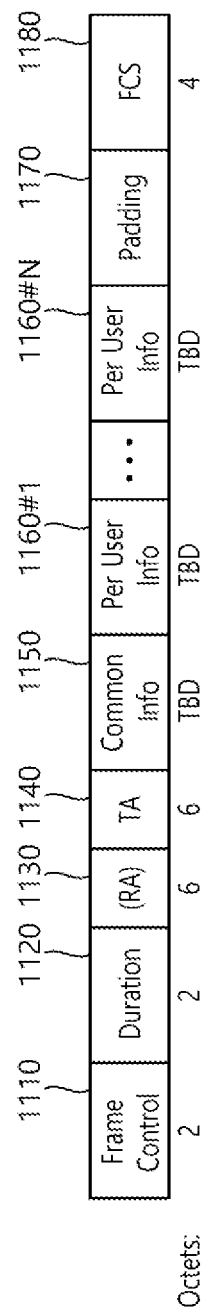
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
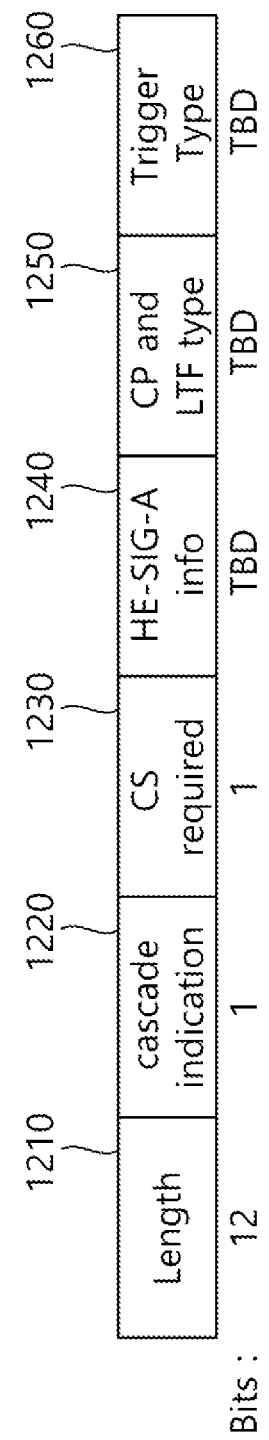
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
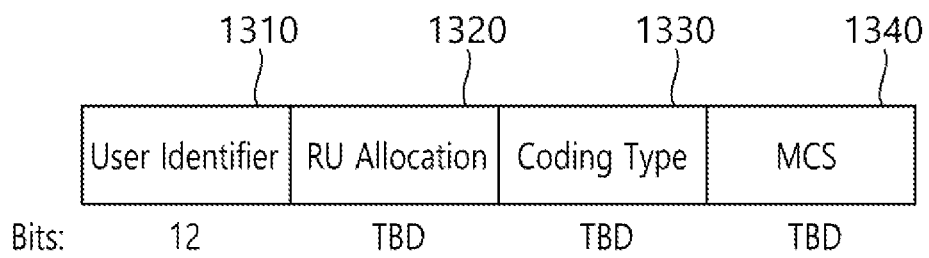
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
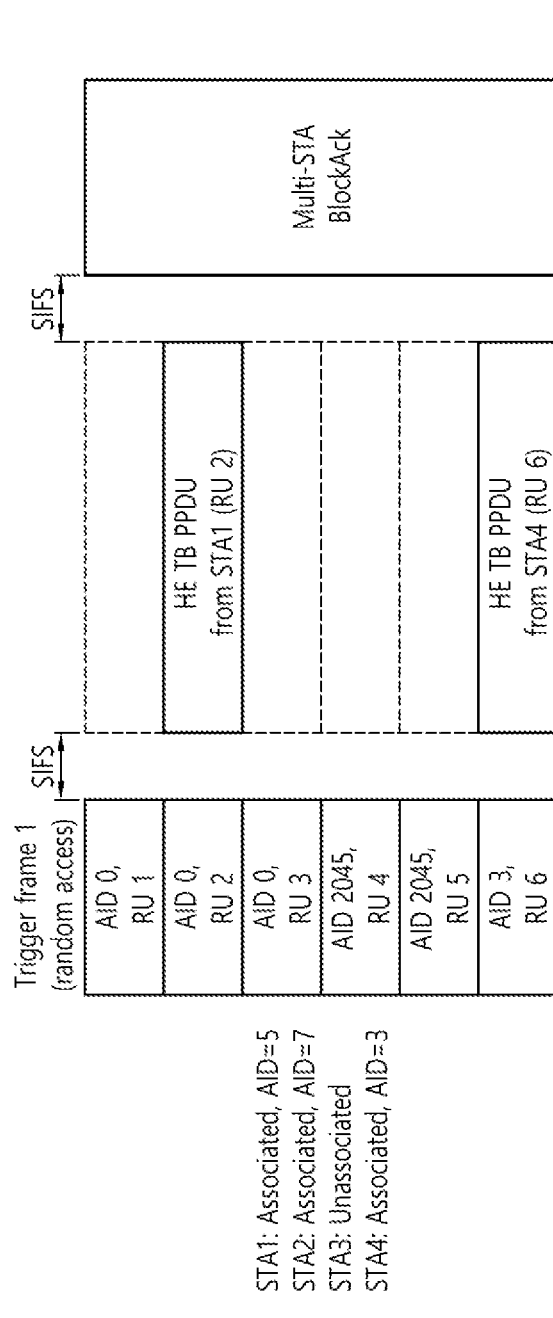
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OB 0 counter is greater than 0.

Figure 15:
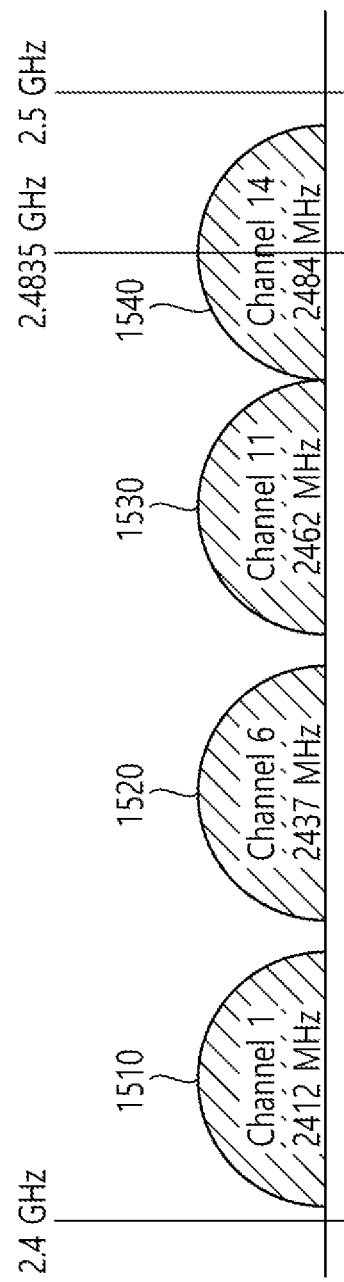
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
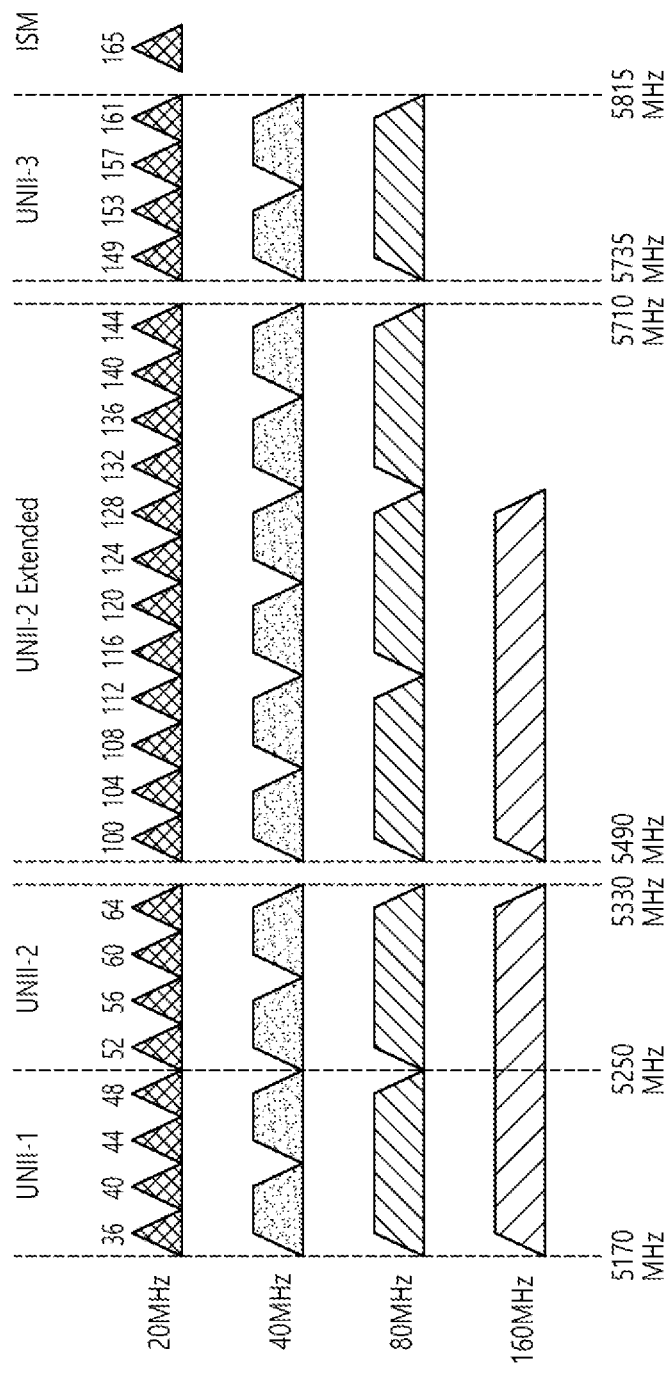
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNIT Low. The UNII-2 may include a frequency domain called UNIT Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
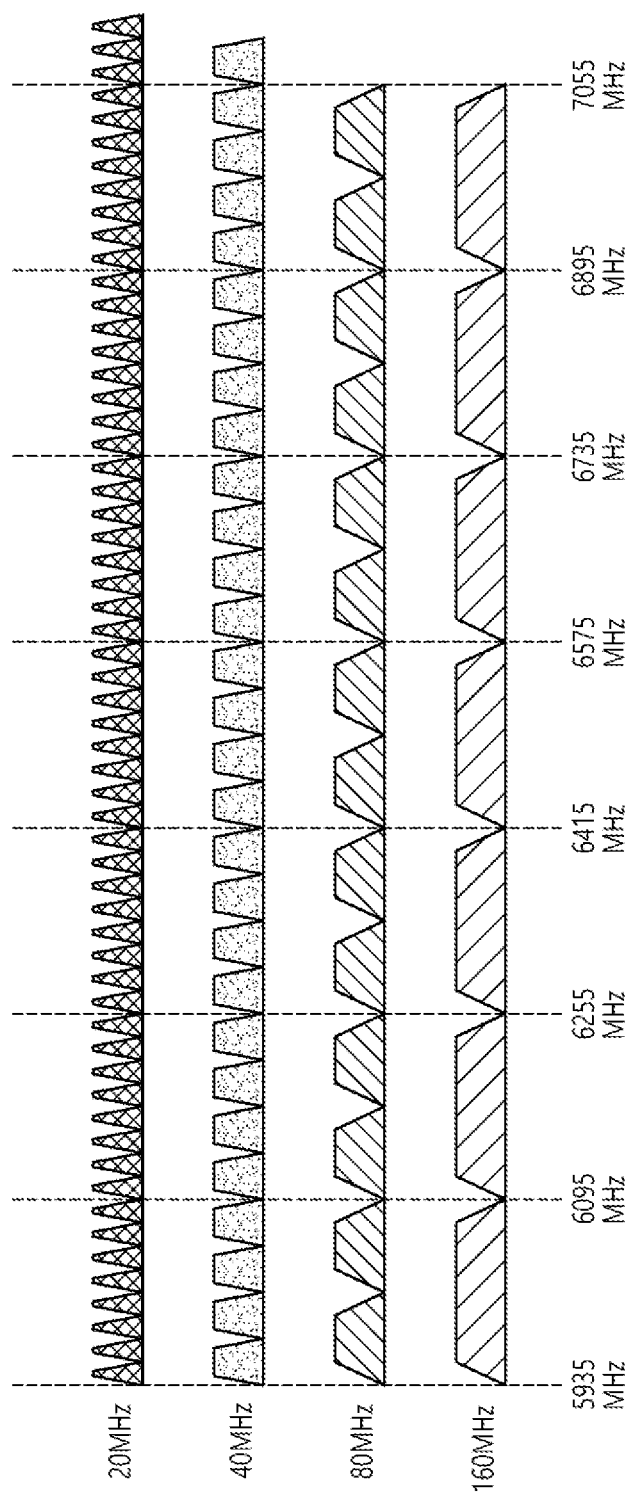
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, an STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU.

For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non–MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 |   | 52 | 1 |
| 2 | 26 | 26 | 26 | 26 | 26 |   | 52 | 26 | 26 | 1 |
| 3 | 26 | 26 | 26 | 26 | 26 |   | 52 |   | 52 | 1 |
| 4 | 26 | 26 |   | 52 |   | 26 | 26 | 26 | 26 | 1 |
| 5 | 26 | 26 |   | 52 |   | 26 | 26 |   | 52 | 1 |
| 6 | 26 | 26 |   | 52 |   |   | 52 | 26 | 26 | 1 |

TABLE 5-continued

| Indices | #1 | #2 | #3 | #4 | #5 | #6 | #7 | #8 | #9 | Number of entries |
|---|---|---|---|---|---|---|---|---|---|---|
| 7 | 26 | 26 |   | 52 |   | 26 |   | 52 |   | 1 |
| 8 |   | 52 |   | 26 | 26 | 26 | 26 | 26 | 26 | 1 |
| 9 |   | 52 |   | 26 | 26 | 26 | 26 |   | 52 | 1 |
| 10 |   | 52 |   | 26 | 26 | 26 |   | 52 | 26 | 26 | 1 |
| 11 |   | 52 |   | 26 | 26 | 26 |   | 52 |   | 52 | 1 |
| 12 |   | 52 |   | 52 |   | 26 | 26 | 26 | 26 | 1 |
| 13 |   | 52 |   | 52 |   | 26 | 26 |   | 52 | 1 |
| 14 |   | 52 |   | 52 |   |   | 52 | 26 | 26 | 1 |
| 15 |   | 52 |   | 52 |   |   | 52 |   | 52 | 1 |
| 16 | 26 | 26 | 26 | 26 | 26 |   | 106 |   |   | 1 |
| 17 | 26 | 26 |   | 52 |   | 26 |   | 106 |   | 1 |
| 18 |   | 52 |   | 26 | 26 | 26 |   | 106 |   | 1 |
| 19 |   | 52 |   | 52 |   | 26 |   | 106 |   | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |   | 106 |   |   | 26 | 26 | 26 | 26 | 26 | 1 |
| 21 |   | 106 |   |   | 26 | 26 | 26 |   | 52 | 1 |
| 22 |   | 106 |   |   | 26 |   | 52 | 26 | 26 | 1 |
| 23 |   | 106 |   |   | 26 |   | 52 |   | 52 | 1 |
| 24 | 52 |   | 52 |   |   | 52 |   | 52 |   | 1 |
| 25 | 242-tone RU empty (with zero users) |   |   |   |   |   |   |   |   | 1 |
| 26 |   | 106 |   |   | 26 |   |   | 106 |   | 1 |
| 27-34 |   |   |   |   | 242 |   |   |   |   | 8 |
| 35-42 |   |   |   |   | 484 |   |   |   |   | 8 |
| 43-50 |   |   |   |   | 996 |   |   |   |   | 8 |
| 51-58 |   |   |   |   | 2*996 |   |   |   |   | 8 |
| 59 | 26 | 26 | 26 | 26 | 26 |   | 52+26 |   | 26 | 1 |
| 60 | 26 |   | 26 + 52 |   | 26 | 26 | 26 | 26 | 26 | 1 |
| 61 | 26 |   | 26 + 52 |   | 26 | 26 | 26 |   | 52 | 1 |
| 62 | 26 |   | 26 + 52 |   | 26 |   | 52 | 26 | 26 | 1 |
| 63 | 26 | 26 |   | 52 |   | 26 |   | 52 + 26 |   | 26 | 1 |
| 64 | 26 |   | 26 + 52 |   | 26 |   | 52 + 26 |   | 26 | 1 |
| 65 | 26 |   | 26 + 52 |   | 26 |   | 52 |   | 52 | 1 |

TABLE 7

| | | | | | | | | | | |
|---|---|---|---|---|---|---|---|---|---|---|
| 66 | 52 |   | 26 | 26 | 26 |   | 52 + 26 |   | 26 | 1 |
| 67 | 52 |   | 52 |   | 26 |   | 52 + 26 |   | 26 | 1 |
| 68 | 52 |   | 52 + 26 |   |   | 52 |   | 52 |   | 1 |
| 69 | 26 | 26 | 26 | 26 |   | 26 + 106 |   |   |   | 1 |
| 70 | 26 |   | 26 + 52 |   | 26 |   | 106 |   |   | 1 |
| 71 | 26 | 26 |   | 52 |   | 26 + 106 |   |   |   | 1 |
| 72 | 26 |   | 26 + 52 |   |   | 26 + 106 |   |   |   | 1 |
| 73 | 52 |   | 26 | 26 |   | 26 + 106 |   |   |   | 1 |
| 74 | 52 |   | 52 |   |   | 26 + 106 |   |   |   | 1 |
| 75 |   | 106 + 26 |   |   |   | 26 | 26 | 26 | 26 | 1 |
| 76 |   | 106 + 26 |   |   |   | 26 | 26 |   | 52 | 1 |
| 77 |   | 106 + 26 |   |   |   |   | 52 | 26 | 26 | 1 |
| 78 |   | 106 |   |   | 26 |   | 52 + 26 |   | 26 | 1 |
| 79 |   | 106 + 26 |   |   |   |   | 52 + 26 |   | 26 | 1 |
| 80 |   | 106 + 26 |   |   |   |   | 52 |   | 52 | 1 |
| 81 |   | 106 + 26 |   |   |   |   | 106 |   |   | 1 |
| 82 |   | 106 |   |   |   |   | 26 + 106 |   |   | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112\text{:}16\text{:}112)=\{M\}*(1+j)/\text{sqrt}(2)$$

$$EHT\text{-}STF(0)=0 \quad \text{<Equation 2>}$$

The EHT-STF for the 40 MHz PPDU may be configured based on the following equation. The following example may be the first type (i.e., 1×STF) sequence.

$$EHT\text{-}STF(-240\text{:}16\text{:}240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$EHT\text{-}STF(-496\text{:}16\text{:}496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$EHT\text{-}STF(-1008\text{:}16\text{:}1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496\text{:}16\text{:}496)=\{-M,-1,M,0,-M,1,-M\}*(1+j)/\text{sqrt}(2) \quad \text{<Equation 6>}$$

Equation 7 to Equation 11 below relate to an example of a second type (i.e., 2×STF) sequence.

$$EHT\text{-}STF(-120\text{:}8\text{:}120)=\{M,0,-M\}*(1+j)/\text{sqrt}(2) \quad \text{<Equation 7>}$$

The EHT-STF for the 40 MHz PPDU may be configured based on the following equation.

$$EHT\text{-}STF(-248\text{:}8\text{:}248)=\{M,-1,-M,0,M,-1,M\}*(1+j)/\text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504\text{:}8\text{:}504)=\{M,-1,M,-1,-M,-1,M,0,-M,1,M,1,-M,1,-M1\}*(1+j)/\text{sqrt}(2) \quad \text{<Equation 9>}$$

The EHT-STF for the 160 MHz PPDU may be configured based on the following equation.

$$EHT\text{-}STF(-1016\text{:}16\text{:}1016)=\{M,-1,M,-1,-M,-1,M,0,-M,1,M,1,-M,1,-M,0,-M,1,-M,1,M,1,-M,0,-M,1,M,1,-M,1,-M1\}*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504\text{:}8\text{:}504)=\{-M,1,-M,1,M,1,-M,0,-M,1,M,1,-M,1,-M1\}*(1+j)/\text{sqrt}(2)$$

$$EHT\text{-}STF(-504)=0,$$

$$EHT\text{-}STF(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
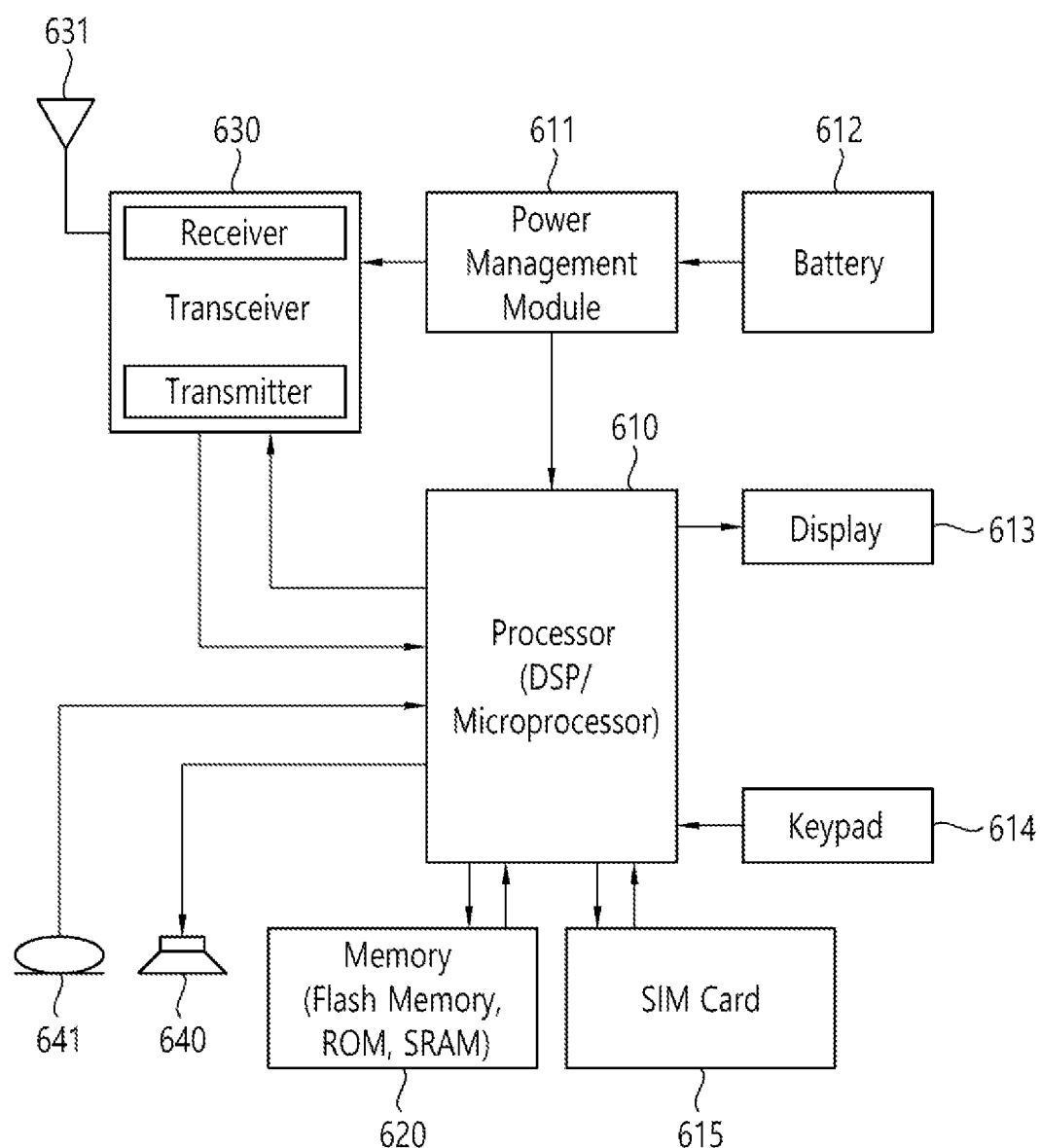
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

1. STF Sequence (or STF Signal)

The main purpose of the HE-STF field is to improve automatic gain control estimation in MIMO transmission.

Figure 20:
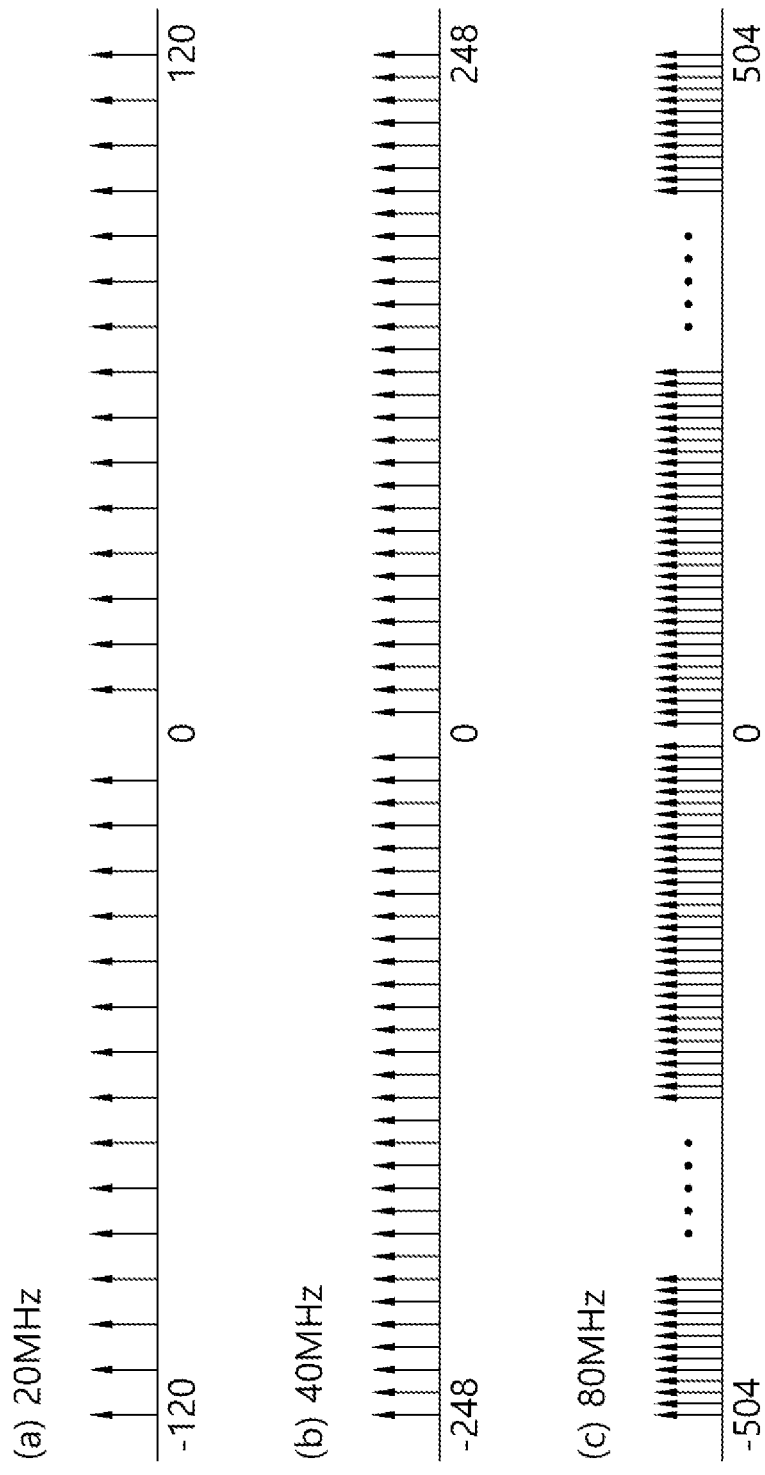
FIG. 20 shows an example of 2×HE-STF tones in PPDU transmission for each channel according to the present embodiment.

FIG. 20 shows an example of 2×HE-STF tones in PPDU transmission for each channel according to the present embodiment. Most particularly, FIG. 20 shows an example of an HE-STF tone (i.e., 8-tone sampling) having a periodicity of 1.6 μs in 20 MHz/40 MHz/80 MHz bandwidths. Accordingly, in FIG. 20, the HE-STF tones for each bandwidth (or channel) may be positioned at 8 tone intervals.

The 2×HE-STF signal according to FIG. 20 may be applied to the uplink MU PPDU. More specifically, the 2×HE-STF signal shown in FIG. 20 may be included in the PPDU, which is transmitted via uplink in response to the above-described trigger frame.

In FIG. 20, the x-axis represents the frequency domain. The numbers on the x-axis represent the indexes of a tone, and the arrows represent mapping of a value that is not equal to 0 (i.e., a non-zero value) to the corresponding tone index.

Sub-drawing (a) of FIG. 20 is a drawing showing an example of a 2×HE-STF tone in a 20 MHz PPDU transmission.

Referring to sub-drawing (a), in case an HE-STF sequence (i.e., 2×HE-STF sequence) for a periodicity of 1.6 us is mapped to tones of a 20 MHz channel, the 2×HE-STF sequence is mapped to tones having tone indexes that are divisible by 8 (i.e., multiples of 8), among the tones having tone indexes ranging from −120 to 120, and, then, 0 may be mapped to the remaining tones. More specifically, in a 20 MHz channel, among the tones having tone indexes ranging from −120 to 120, a 2×HE-STF tone may be positioned at a tone index that is divisible by 8 excluding the DC. Accordingly, a total of 30 2×HE-STF tones having the 2×HE-STF sequence mapped thereto may exist in the 20 MHz channel.

Sub-drawing (b) of FIG. 20 illustrates an example of a 2×HE-STF tone in a 40 MHz PPDU transmission.

Referring to sub-drawing (b), in case an HE-STF sequence (i.e., 2×HE-STF sequence) for a periodicity of 1.6 μs is mapped to tones of a 40 MHz channel, the 2×HE-STF sequence is mapped to tones having tone indexes that are divisible by 8 (i.e., multiples of 8), among the tones having tone indexes ranging from −248 to 248, and, then, 0 may be mapped to the remaining tones. More specifically, in a 40 MHz channel, among the tones having tone indexes ranging from −248 to 248, a 2×HE-STF tone may be positioned at a tone index that is divisible by 8 excluding the DC. Herein, however, tones having tone indexes of ±248 correspond to guard tones (left and right guard tones), and such guard tones may be processed with nulling (i.e., such guard tones may have a value of 0). Accordingly, a total of 60 2×HE-STF tones having the 2×HE-STF sequence mapped thereto may exist in the 40 MHz channel.

Sub-drawing (c) of FIG. 20 illustrates an example of a 2×HE-STF tone in an 80 MHz PPDU transmission.

Referring to sub-drawing (c), in case an HE-STF sequence (i.e., 2×HE-STF sequence) for a periodicity of 1.6 μs is mapped to tones of an 80 MHz channel, the 2×HE-STF sequence is mapped to tones having tone indexes that are divisible by 8 (i.e., multiples of 8), among the tones having tone indexes ranging from −504 to 504, and, then, 0 may be mapped to the remaining tones. More specifically, in an 80 MHz channel, among the tones having tone indexes ranging from −504 to 504, a 2×HE-STF tone may be positioned at a tone index that is divisible by 8 excluding the DC. Herein, however, tones having tone indexes of ±504 correspond to guard tones (left and right guard tones), and such guard tones may be processed with nulling (i.e., such guard tones may have a value of 0). Accordingly, a total of 124 2×HE-STF tones having the 2×HE-STF sequence mapped thereto may exist in the 80 MHz channel.

The 2×HE-STF sequence of FIG. 20 may be used to configure the HE-STF field for the HE TB PPDU.

2. Examples Applicable to the Present Specification

The WLAN 802.11 system considers transmission of an increased stream by using a wider band than the existing 802.11ax or by using more antennas to increase peak throughput. In addition, the WLAN 802.11 system is also considering a method of using aggregation of various bands.

This specification considers a case of using a wide band, that is, a case of transmitting a PPDU using 240/320 MHz, and proposes a 2×EHTSTF sequence at this time. In particular, this specification considers various RU aggregation.

In the existing 802.11ax, 1×/2×HE-STF sequence is defined, 1×HE-STF is used for all HE PPDUs except for HE TB PPDU of uplink transmission, and 2×HE-STF is used for HE TB PPDU. In the 1×HE-STF sequence, the sequence is mapped in units of 16 subcarriers, and when the IFFT is performed, a 12.8 us symbol is generated and the same signal is repeated in units of 0.8 μs. This 0.8 us signal is repeated 5 times to construct 1×HE-STF of 4 μs. The 2×HE-STF sequence is mapped in units of 8 subcarriers, and when IFFT is performed, a 12.8 us symbol is generated and the same signal is repeated in units of 1.6 μs. This 1.6 us signal is repeated 5 times to form 2×HE-STF of 8 μs. This specification proposes a design of a 2×STF sequence when transmitting a PPDU in a wide band, and this sequence is called a 2×EHT-STF sequence. FIG. 18 shows a representative structure of an 802.11be PPDU, and the proposed 2×EHT-STF sequence is a frequency domain sequence applied to the EHT-STF of FIG. 18. In the case of the EHT TB PPDU to which the 2×EHT-STF sequence is applied in FIG. 18, the EHT-SIG may be omitted.

The above can be expressed differently as follows. The STF signal may be generated based on the STF sequence. The STF sequence may be expressed based on a preset subcarrier interval (e.g., 78.125 kHz). The STF sequence of the present specification may be called various names such as an EHT-STF sequence or an EHT STF sequence.

As described above, the STF may be set to various types. For example, the first type of STF (i.e., 1×STF) may be generated based on the first type STF sequence in which non-zero coefficients are disposed at intervals of 16 subcarriers. The STF signal generated based on the first type STF sequence may have a period of 0.8 and the 0.8 μs period signal may be repeated 5 times to become a first type STF having a length of 4 For example, the second type of STF (i.e., 2×STF) may be generated based on the second type STF sequence in which non-zero coefficients are disposed at intervals of 8 subcarriers. The STF signal generated based on the second type STF sequence may have a period of 1.6 μs, and the 1.6 μs period signal may be repeated 5 times to become a second type EHT-STF having a length of 8 μs (shown in FIG. 20). For example, the third type of STF (i.e., 4×EHT-STF) may be generated based on the third type STF sequence in which non-zero coefficients are disposed at intervals of 4 subcarriers.

As described above, the second type (i.e., 2×STF) STF may be used for a TB PPDU transmitted corresponding to a trigger frame, and the first type STF may be used for a SU/MU PPDU of a different type other than the TB PPDU.

In 802.11be, the bandwidth of contiguous 240/320 MHz and non-contiguous 160+80/80+160/160+160 MHz can be used in addition to the existing 20/40/80/160/80+80 MHz bandwidth. And, the configuration of the 2×EHT-STF sequence applied to 240/320 MHz may vary depending on the tone plan. In the present specification, a broadband tone plan having a structure in which the 80 MHz tone plan of the existing 11ax is repeated is considered. In this situation, the 2×EHT-STF sequence can be configured by repeating the 80 MHz 2×STF sequence. However, due to the nature of the sequence being repeated, the PAPR may be high, so it may be necessary to additionally apply phase rotation. In 802.11ax, the 160 MHz 2×HE-STF sequence was constructed by repeating the 80 MHz 2×HESTF sequence twice, and then the first 40 MHz part of the secondary 80 MHz channel (or the 80 MHz channel with a relatively high frequency) was multiplied by −1 to construct the sequence. In this specification, this method is applicable, that is, sequence for reducing PAPR by repeating the 80 MHz 2×STF sequence and applying additional phase rotation in units of 20/40/80 MHz to other channels except for the primary channel (or 80 MHz channel having a relatively low frequency) can be proposed. In addition, at 320 MHz, a sequence for lowering PAPR by repeating the 160 MHz 2×STF sequence and applying additional phase rotation in units of 20/40/80/160 MHz to the secondary 160 MHz channel (or a 160 MHz channel with a relatively high frequency) may be proposed. 240/160+80/80+160 MHz (band) can be considered as puncturing 80 MHz part from 320/160+160 MHz. That is, a sequence excluding the punctured 80 MHz 2×EHT-STF part among 2×EHT-STFs used at 320/160+160 MHz may be used as 2×EHT-STF of 240/160+80/80+160 MHz. Therefore, in the present specification, a 2×EHT-STF sequence of 320/160+160 MHz is first proposed, and a 2×EHT-STF sequence of 240/160+80/80+160 MHz made by puncturing it is proposed. In addition, the 2×EHT-STF sequence based on the repetition of the 80 MHz 2×STF sequence at 240/160+80/80+160 MHz may be proposed.

Below, when optimizing the 2×EHT-STF sequence at 320 MHz and 240 MHz, the RU and the combination of RUs considered when calculating PAPR will be described.

320 MHz: 26 RU (148), 52 RU (64), 106 RU (32), 242 RU (16), 484 RU (8), 996 RU (4), 26+52 RU (16), 242+484 RU (16), 2×996 RU (2), 484+996 RU (8), 3×996 RU (4), 4×996 RU (1)

240 MHz: 26 RU (111), 52 RU (48), 106 RU (24), 242 RU (12), 484 RU (6), 996 RU (3), 26+52 RU (12), 242+484 RU (12), 2×996 RU (2), 484+996 RU (8), 3×996 RU (1)

The tone plan of the 80 MHz band is shown in FIG. 7, and if it is repeated 4 times or 3 times, the number of each RU may come out as above.

Figure 21:
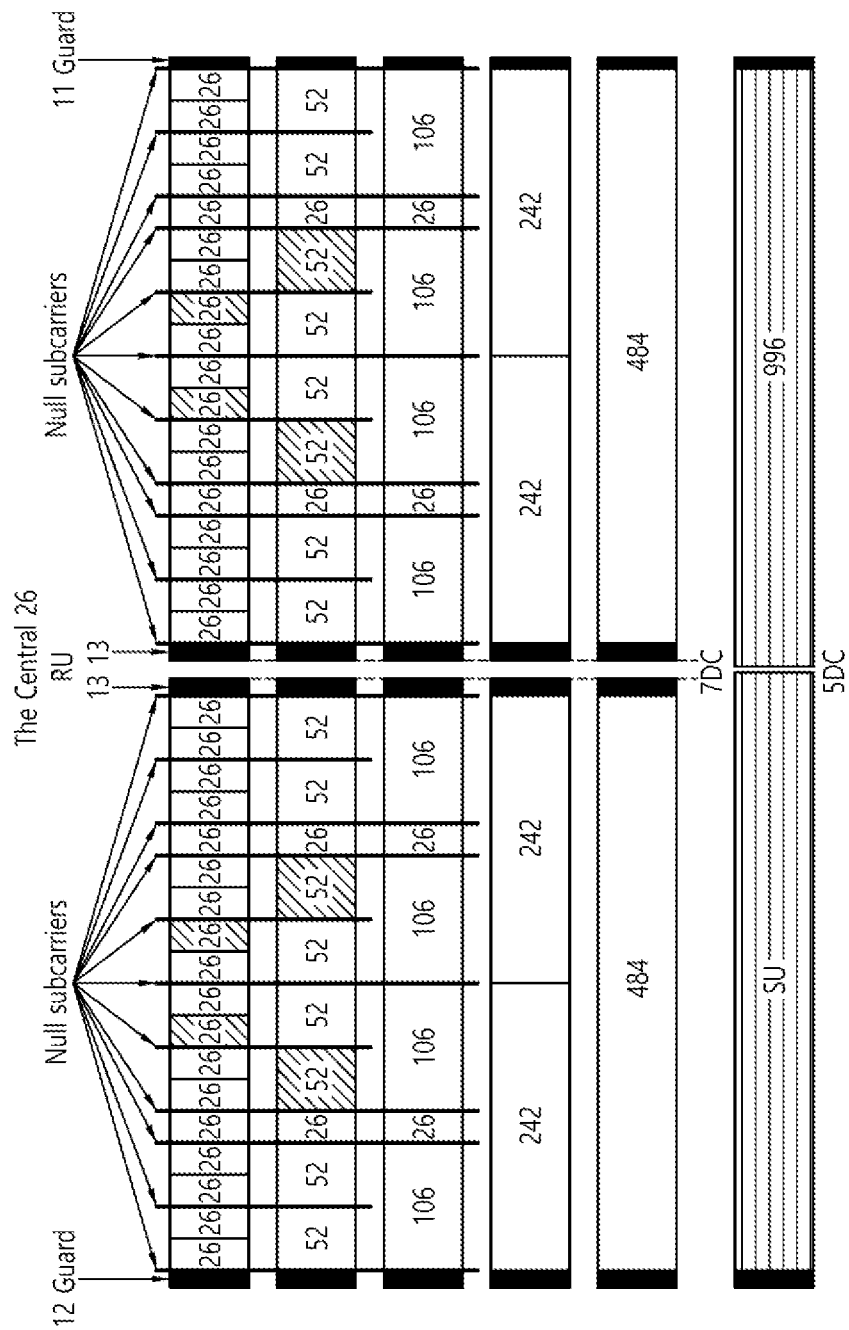
FIG. 21 is a diagram illustrating a combination of 26+52 RUs in a tone plan of an 80 MHz band.

FIG. 21 is a diagram illustrating a combination of 26+52 RUs in a tone plan of an 80 MHz band.

In the case of RU aggregation, 26+52 RU can be combined with consecutive 26 RU and 52 RU indicated by shade as shown in FIG. 21 in each 80 MHz channel (four types). Therefore, a combination of 16 types of 26 RU and 52 RU is possible at 320 MHz, and a combination of 12 types of 26 RU and 52 RU is possible at 240 MHz.

A total of 4 combinations of 242+484 RU are possible in each 80 MHz channel. Therefore, 16 combinations are possible at 320 MHz, and 12 combinations are possible at 240 MHz.

484+996 RU is available in a total of 4 combinations in each 160 MHz channel. At 320 MHz, this combination is allowed at each of the primary 160 MHz and secondary 160 MHz, so a total of 8 combinations are possible. At 240 MHz, this combination is allowed in two consecutive 80 MHz channels, so a total of 8 combinations are possible as well.

For 2×996 RU, a total of 1 combination is possible in each 160 MHz channel. At 320 MHz, this combination is allowed in each of the primary 160 MHz and secondary 160 MHz, so a total of two combinations are possible. At 240 MHz, this combination is allowed in two consecutive 80 MHz channels, so a total of two combinations are also possible.

As for 3×996 RU, a combination of any 996 RU is allowed at 320 MHz, so a total of 4 combinations are possible and only one combination is possible at 240 MHz.

Only one combination of 4×996 RUs is possible at 320 MHz.

In the proposal below, PAPR means the largest PAPR value among several RUs and RU combinations. In addition, the sequence is optimized from the perspective of PAPR, and bandwidth is considered only for contiguous situations when calculating PAPR, but the proposed sequence can be applied to non-contiguous situations as it is.

An optimized sequence using the same M sequence as in 802.11ax may be proposed in the present disclosure, and the M sequence is as follows.

M={−1, −1, −1, 1, 1, 1, −1, 1, 1, 1, −1, 1, 1, −1, 1}

In the following example, a sequence may be described/explained based on the following method.

For example, in the case of the $EHTS_{-496\ 16\ 496}$ sequence, the index range of the corresponding sequence is defined between −496 and +496, and the elements of the sequence are defined at intervals of 16 (tones). That is, A specific value may be assigned to at −496, −480, −464, . . . −16, 0, +16, . . . , +496.

In the present specification, the 1× sequence may be defined at 16 index intervals like the $EHTS_{-496:16:496}$ sequence. In addition, the 2× sequence may be defined with an 8 index interval. For example, a 4× sequence may be defined with 4 index intervals.

The index of the sequence may indicate a position in the frequency domain and may be determined based on a subcarrier frequency spacing value. For example, if delta_f (e.g., 78.125 kHz) is applied to the HE-STF sequence (or HE-STF field), index '0' means a DC component, and index '16' means a 16*delta_f kHz point. Also, index '−16' may mean a point of −16* delta_f kHz. For example, the delta_f value may be set to 312.5 kHz/N (N=integer), or 312.5 kHz*N (N=integer).

Meanwhile, for convenience of description, commas may be omitted/skipped in the present disclosure, for example, {M 1 −M 0 −M 1 −M}*(1+j)/sqrt(2) is identical to {M, 1, −M, 0, −M, 1, −M}*(1+j)/sqrt(2).

2.1. 320 MHz 2×EHT-STF Sequence

This embodiment proposes a method of simply repeating the existing 80 MHz 2×HESTF sequence and a sequence for lowering PAPR by applying additional phase rotation in units of 20/40/80 MHz to other channels except for the primary channel (or a channel with a relatively low frequency of 80 MHz) by repeating the existing 80 MHz 2×HESTF sequence. In addition, this embodiment proposes a method of simply repeating the existing 160 MHz 2×HESTF sequence and a sequence for lowering PAPR by applying additional phase rotation in units of 20/40/80/160 MHz to a secondary 160 MHz channel (or a 160 MHz channel with a relatively high frequency) by repeating the existing 160 MHz 1×HESTF sequence. For reference, all PAPRs below are calculated when 4 times Inverse Fast Fourier Transform (IFFT)/Inverse Discrete Fourier Transform (IDFT) is applied, and the unit of the calculated PAPR is dB.

2.1.1. Repetition of 80 MHz 2×STF Sequence

By repeating the 80 MHz 2×HE-STF sequence of the existing 802.11ax four times, the 1×EHT-STF sequence can be configured as follows:

$EHTS_{-2040:8:2040}$={M −1 M −1 −M −1 M 0 −M 1 M 1 −M 1 −M 0 M −1 M −1 −M −1 M 0 −M 1 M 1 −M 1 −M 0 M −1 M −1 −M 1 M 0 −M 1 M 1 −M 0 M −1 M −1 −M −1 M 0 −M 1 M 1 −M 1 −M 0 M −1 M 0 −M 1 M 1 −M 1 −M}*(1+j)/sqrt(2)

$EHTS_{-2040}$=$EHTS_{-1032}$=$EHTS_{-1016}$=$EHTS_{-8}$=$EHTS_{8}$=$EHTS_{1016}$=$EHTS_{1032}$=$EHTS_{2040}$=0

Max PAPR is 10.8833.

2.1.2. Repetition 80 MHz 2×STF sequence and additional phase rotation in units of 20 MHz in secondary channel (or channel except for 80 MHz channel with lowest frequency)

$EHTS_{-2040:8:2040}$ = {M −1 M −1 −M −1 M 0 −M 1 M 1 −M 1 −M 0 M −1 M −1 −M −1 M 0 −M 1 M −1 M −1 M 0 −M 1 −M 1 M 1 −M 0 M −1 −M 1 −M 1 −M 0 −M 1 M 1 −M 0 −M 1 M −1 M −1 M}*(1+j)/sqrt(2)

Or $EHTS_{-2040:8:2040}$ = {M −1 M −1 −M −1 M 0 −M 1 M 1 −M 1 −M 0 M −1 M −1 −M −1 M 0 −M 1 M −1 M −1 M 0 −M 1 −M 1 M 1 −M 0 M −1 −M −1 M −1 M 0 −M 1 −M 1 M 1 −M 0 −M 1 M −1 M −1 M}*(1+j)/sqrt(2)

Or $EHTS_{-2040:8:2040}$ = {M −1 M −1 −M −1 M 0 −M 1 M 1 −M 1 −M 0 M −1 M −1 −M −1 M 0 M −1 −M 1 −M 1 −M 0 −M 1 −M 1 M 1 −M 0 −M 1 M −1 M −1 M 0 −M 1 −M 1 M 1 −M 0 M −1 −M 1 −M 1 −M}*(1+j)/sqrt(2)

Among all the above sequences, the coefficient below is replaced with 0.

$EHTS_{-2040}$ = $EHTS_{-1032}$ = $EHTS_{-1016}$ = $EHTS_{-8}$ = $EHTS_8$ = $EHTS_{1016}$ = $EHTS_{1032}$ = $EHTS_{2040}$ = 0

Max PAPR is 7.7789.

2.1.3. Repetition of 80 MHz 2×STF sequence and additional phase rotation in 40 MHz units in secondary channel (or channel excluding 80 MHz channel with lowest frequency)

$EHTS_{-2040:8:2040}$ = {M −1 M −1 −M −1 M 0 −M 1 M 1 −M 1 −M 0 −M 1 −M 1 M 1 −M 0 M −1 −M −1 M −1 M 0 M −1 M −1 −M −1 M 0 M −1 −M −1 M −1 M 0 M −1 −M −1 −M −1 M 0 M −1 −M −1 M −1 M}*(1+j)/sqrt(2)

or $EHTS_{-2040:8:2040}$ = {M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 −M 1 M 1 −M 1 −M 0 −M 1 M 1 −M 0 −M 1 M −1 M −1 −M}*(1+j)/sqrt(2)

Among all the above sequences, the coefficient below is replaced with 0.

$EHTS_{-2040}$ = $EHTS_{-1032}$ = $EHTS_{-1016}$ = $EHTS_{-8}$ = $EHTS_8$ = $EHTS_{1016}$ = $EHTS_{1032}$ = $EHTS_{2040}$ = 0

Max PAPR is 8.9154.

2.1.4. Repetition of 80 MHz 2×STF sequence and additional phase rotation in 80 MHz units in secondary channel (or channel except for 80 MHz channel with lowest frequency)

$EHTS_{-2040:8:2040}$ = {M −1 M −1 −M −1 M 0 −M 1 M 1 −M 1 −M 0 M −1 M −1 −M −1 M 0 −M 1 M −1 M −1 −M 0 −M 1 M 1 −M 0 M −1 −M −1 M −1 M 0 −M 1 M 1 −M 1 −M 0 M −1 −M −1 M −1 M}*(1+j)/sqrt(2)

$EHTS_{-2040}$ = $EHTS_{-1032}$ = $EHTS_{-1016}$ = $EHTS_{-8}$ = $EHTS_8$ = $EHTS_{1016}$ = $EHTS_{1032}$ = $EHTS_{2040}$ = 0

Max PAPR is 9.0112.

As in this embodiment (2.1.4), it can be seen that the PAPR of the 2×EHT-STF sequence obtained by repeating the 80 MHz 2×HE-STF sequence and considering additional phase rotation is lower than the PAPR of the 2×EHT-STF sequence obtained by simply repeating the 80 MHz 2×HE-STF sequence as in the previous embodiment (2.1.1). Accordingly, there is an effect that the efficiency of the subcarrier and the effective AGC can be estimated.

In addition, even if a specific coefficient other than 0 is set in the element whose tone index is −8, +8, −1016, +1016, −1032, +1032, −2040, +2040 in the proposed 2×EHT-STF sequence, there is no problem in terms of PAPR. However, there may be performance loss because power is loaded on tones that do not need to be loaded from the viewpoint of transmission power, not from the PAPR side. In particular, when a specific coefficient other than 0 is loaded in DC, a problem such as a DC offset may occur, which may cause signal distortion. That is, by setting the element having the tone index of −8, +8, −1016, +1016, −1032, +1032, −2040, +2040 to 0, there is also an effect of being able to solve the problem of performance loss when the receiving STA operates the AGC.

2.1.5. Repetition of 160 MHz 2×STF sequence

By repeating the 160 MHz 2×HE-STF sequence of the existing 802.11ax twice, the 2×EHT-STF sequence can be configured as follows:

$EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M 1 −M 1 −M 0 −M 1 −M 1 M 1 −M 0 −M 1 M 1 −M 1 −M}*(1+j)/sqrt(2)

Among all the above sequences, the coefficient below is replaced with 0.

$EHTS_{-2040}$ = $EHTS_{-1032}$ = $EHTS_{-1016}$ = $EHTS_{-8}$ = $EHTS_8$ = $EHTS_{1016}$ = $EHTS_{1032}$ = $EHTS_{2040}$ = 0

Max PAPR is 9.0115.

2.1.6. Repetition of 160 MHz 2×STF sequence and additional phase rotation in units of 20 MHz in secondary channel (or 160 MHz channel with relatively high frequency)

$EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M 1 −M 1 −M 0 −M 1 −M 1 M 1 −M 0 −M 1 M 1 −M 1 −M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 M 1 −M 0 M −1 M −1 −M −1 M 0 −M 1 M 1 −M 1 −M 0 −M 1 M 1 −M 1 −M 0 −M 1 M 1 −M 1 M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 M −1 −M −1 M 0 −M 1 M 1 −M 1 −M 0 −M 1 −M 1 M 1 −M 0 −M 1 M 1 −M 1 M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 −M 1 M 0 −M 1 M 1 −M 1 −M 0 −M 1 −M 1 M 1 −M 0 −M 1 M 1 −M 1 M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 0 M −1 M 1 −M 0 −M 1 M 1 −M 1 −M 0 −M 1 −M 1 M 1 −M 0 −M 1 M 1 −M 1 −M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 M 1 −M 1 −M 1 M 1 −M 1 −M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M 1 −M 1 M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 −M 1 M −1 M −1 M 0 −M 1 M −1 M −1 M}*(1+j)/sqrt(2)

Or $EHTS_{-2040:8:2040}$ = {M −1 M −1 −M −1 M 0 −M 1 M 1 −M 1 −M 0 −M 1 −M 1 M 1 −M 0 M −1 M −1 −M −1 M 0 −M 1 M −1 M −1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M −1 M −1 M 0 −M 1 −M 1 −M −1 M 0 M −1 −M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M −1 M −1 M 0 M −1 M 1 1 −M 0 −M 1 M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M −1 M −1 M 0 M −1 M 1 1 −M 0 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M −1 M −1 M 0 M −1 M 1 1 −M 0 M −1 −M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M −1 M −1 M 0 M −1 −M −1 M 0 M −1 −M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 M 1 −M 0 M −1 −M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 M 1 −M 0 M −1 −M 1 −M 1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 M 1 −M 0 −M 1 −M 1 −M −1 M 0 −M 1 M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 −M −1 M 0 M −1 −M 1 −M 1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 −M −1 M 0 M −1 −M 1 −M 1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 M 1 −M 0 −M 1 M 1 −M 0 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 M 1 1 −M 0 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 M 1 −M 0 M −1 −M 1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 −M 1 −M 0 M −1 M −1 −M −1 M 0 −M 1 M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M −1 M 1 −M 0 M −1 −M 1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M −1 M 0 M −1 −M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M −1 M −1 M 0 M −1 −M 1 −M 1 −M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M −1 M −1 M 0 −M 1 −M 1 M 1 −M 0 M −1 −M 1 −M 1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M −1 M −1 M 0 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 M 1 1 −M 0 −M 1 M −1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M −1 M −1 M 0 M −1 M 1 1 −M 0 M −1 −M 1 −M 1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M −1 M −1 M 0 M −1 −M 1 M −1 M}*(1+j)/sqrt(2)

Or

EHTS$_{2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 M −1 −M 1 M −1 M 1 −M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 −M 1 −M 1 M 1 −M 0 −M 1 M −1 M −1 M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 −M 1 −M 1 M 1 −M 0 M −1 −M 1 −M 1 −M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 −M 1 −M 1 M 1 −M 0 M −1 −M −1 M −1 M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 −M 1 −M −1 −M −1 M 0 −M 1 M 1 −M 1 −M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 M −1 M 1 M 1 −M 0 M −1 −M −1 M −1 M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 M −1 M 1 M 1 −M 0 −M 1 M 1 −M 1 −M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 M −1 −M 1 −M 1 M 1 −M 0 M −1 −M 1 −M 1 M}*(1+j)/sqrt(2)

Or
$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 −M 1 M 1 −M 1 −M 0 M −1 −M −1 M 0 −M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 −M 1 M 1 −M 1 −M 0 M −1 M −1 −M −1 M 0 −M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 −M 1 M 1 −M 1 −M 0 M −1 M −1 −M −1 M 0 M −1 M 1 M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 −M 1 M 1 −M 1 −M 0 M −1 −M 1 −M 1 M 0 −M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 M −1 −M 1 −M 1 M 0 −M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 −M 1 M 1 −M 1 −M 0 M −1 M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 M −1 −M 1 −M 1 M 0 −M 1 M 1 −M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 −M 1 M 1 −M 1 −M 0 M −1 M 1 M 1 −M 0 M −1 M 1 M −1 M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 M −1 −M 1 −M 1 −M 0 M −1 M 1 M 1 −M 0 M −1 M 1 M −1 M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 M −1 −M 1 −M 1 −M 0 M −1 M 1 M 1 −M 0 −M 1 M −1 M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 M −1 −M 1 −M 1 −M 0 M −1 M 1 M 1 −M 0 M −1 M −1 −M 1 M}*(1+j)/sqrt(2)

Or
$EHTS_{-2040:8:2040}$={M −1 M −1 −M −1 M 0 −M 1 M 1 −M 0 −M 1 −M 1 M 1 −M 0 M −1 −M 1 −M 1 −M 0 M −1 M 1 M 1 −M 0 M −1 −M 1 M −1 M 1 −M}*(1+j)/sqrt(2)

Or
$EHTS_{-2040:8:2040}$={M −1 M −1 −M −1 M 0 −M 1 M 1 −M 0 −M 1 −M 1 M 1 −M 0 M −1 −M 1 −M 1 −M 0 M −1 M 1 M 1 −M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 −M 1 M 1 −M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 −M −1 −M −1 M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 −M −1 −M −1 M 0 −M 1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 M 1 −M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 −M 1 −M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M 1 M 1 −M 0 M −1 −M −1 M −1 M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 0 −M 1 −M 1 M 1 −M 0 M −1 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 M −1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 M −1 −M 1 M −1 −M 1 M −1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 M −1 −M 1 M −1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 M −1 −M 1 M −1 −M 1 −M −1 M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 M −1 −M 1 M −1 −M 1 −M −1 M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 −M 0 −M 1 −M 1 M 1 −M 0 −M 1 M −1 −M 1 M −1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 −M 0 −M 1 M 1 M 1 −M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 −M 0 −M 1 M −1 −M 1 M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 −M 0 −M 1 M −1 −M 1 M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 M −1 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 −M 0 −M 1 M −1 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 M −1 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 M −1 −M 1 M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 M 1 M 1 −M 0 M −1 −M 1 M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 0 −M 1 M 1 M 1 −M 0 M −1 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 −M 1 M 0 −M 1 −M 1 −M 1 M 0 −M 1 −M 1 M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −

$EHTS\_{2040:8:2040}$={M −1 −M −1 −M −1 M 0 M −1 −M −1 M −1 M 0 −M 1 −M −1 −M −1 M 0 M −1 −M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M −1 −M −1 M 0 M −1 −M −1 M −1 M 0 −M 1 M 1 −M 0 M −1 −M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M −1 −M −1 M 0 M −1 −M −1 M −1 M 0 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M −1 −M −1 M 0 M −1 −M −1 M −1 M 0 M −1 M 0 −M 1 −M 1 −M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 −M 1 M 1 M 1 −M 0 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 −M 1 −M −1 −M −1 M 0 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 −M 1 −M −1 −M −1 M 0 M −1 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 M −1 M 1 −M −1 M 0 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 M −1 −M 1 M −1 M 0 −M 1 M −1 M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M −1 −M 0 M −1 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M 0 M −1 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M −1 M 0 −M 1 M −1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M 1 −M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 M 1 −M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M −1 M 0 −M 1 M −1 M −1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M −1 −M 0 −M 1 M −1 M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 M −1 M 0 −M 1 M −1 −M 1 M 1 −M 0 −M 1 M 1 −M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 M −1 M 0 M −1 M 1 −M 0 −M 1 M 1 −M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 M −1 M 0 M −1 M 1 −M 1 M 1 −M 0 M −1 −M 1 M −1 M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 M −1 M 0 M −1 M 1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 −M 1 M 0 M −1 M −1 −M}*(1+j)/sqrt(2)

Or $EHTS\_{2040:8:2040}$={M −1 M −1 −M −1 M 0 −M 1 M 1 −M 1 −M 0 −M 1 −M 1 M 1 −M 0 −M 1 M −1 M −1 M 0 −M 1 −M 1 M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M −1 M −1 M 0 M −1 M −1 −M −1 M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M −1 −M −1 M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M −1 −M −1 M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 1 −M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 1 −M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 M 1 −M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M 1 −M 1 −M 0 M −1 M 1 M 1 −M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M 1 −M 1 −M 0 M −1 M 1 M 1 −M 0 M −1 −M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M 1 −M 1 −M 0 M −1 M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 −M 1 M 1 −M 0 −M 1 −M 1 −M 0 −M 1 −M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M 1 −M 1 −M}*(1+j)/sqrt(2)

Among all the above sequences, the coefficient below is replaced with 0.

EHTS$_{-2040}$=EHTS$_{-1032}$=EHTS$_{-1016}$= EHTS$_{-8}$=EHTS$_8$=EHTS$_{1016}$=EHTS$_{1032}$=EHTS$_{2040}$=0

Max PAPR is 9.0115.

2.1.7. Repetition of 160 MHz 2×STF sequence and additional phase rotation in 40 MHz units in secondary channel (or 160 MHz channel with relatively high frequency)

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 −M −1 M 0 −M 1 M 1 −M 1 −M 0 −M 1 M 1 −M 0 −M 1 M 1 −M 1 −M}*(1+j)/sqrt(2)

or

EHTS$_{-2040:8:2040}$={M −1 M −1 −M −1 M 0 −M 1 M 1 −M 1 −M 0 −M 1 −M 1 M 1 −M 0 M −1 −M −1 M 0 M −1 −M −1 M −1 M 0 −M 1 −M 1 M 1 −M 0 M −1 −M −1 M −1 M}*(1+j)/sqrt(2)

or

EHTS$_{-2040:8:2040}$={M −1 M −1 −M −1 M 0 −M 1 M 1 −M 1 −M 0 −M 1 −M 1 M 1 −M 0 −M 1 −M 1 M 0 M −1 −M −1 M −1 M 0 M −1 M −1 −M −1 M 1 −M 1 −M}*(1+j)/sqrt(2)

or

EHTS$_{-2040:8:2040}$={M −1 M −1 −M −1 M 0 −M 1 M 1 −M 1 −M 0 −M 1 −M 1 M 1 −M 0 M −1 −M −1 M 0 M −1 −M −1 M −1 M 0 M −1 −M −1 M −1 M}*(1+j)/sqrt(2)

or

EHTS$_{-2040:8:2040}$={M −1 M −1 −M −1 M 0 −M 1 M 1 −M 1 −M 0 −M 1 −M 1 M 1 −M 0 M −1

1 −M 1 M 1 −M 0 −M 1 M 1 −M 1 −M 0 M −1 M −1 −M −1 M 0 −M 1 M 1 −M 1 −M}*(1+j)/sqrt(2)

or $EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 −M 1 M 1 −M 1 −M}*(1+j)/sqrt(2)

Among all the above sequences, the coefficient below is replaced with 0.

$EHTS_{-2040}=EHTS_{-1032}=EHTS_{-1016}=EHTS_{-8}=EHTS_8=EHTS_{1016}=EHTS_{1032}=EHTS_{2040}=0$

Max PAPR is 9.0115.

2.1.8. Repetition of 160 MHz 2×STF sequence and additional phase rotation in 80 MHz units in secondary channel (or 160 MHz channel with relatively high frequency)

$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 −M 1 M 1 −M 1 −M 0 −M 1 −M 1 M 1 −M 0 −M 1 M 1 −M 1 −M}*(1+j)/sqrt(2)

or $EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 −M 1 M 1 −M 1 −M}*(1+j)/sqrt(2)

Among all the above sequences, the coefficient below is replaced with 0.

$EHTS_{-2040}=EHTS_{-1032}=EHTS_{-1016}=EHTS_{-8}=EHTS_8=EHTS_{1016}=EHTS_{1032}=EHTS_{2040}=0$

Max PAPR is 9.0115.

2.1.9. Repetition of 160 MHz 2×STF sequence and additional phase rotation in 160 MHz units in secondary channel (or 160 MHz channel with relatively high frequency)

$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 −M −1 M 0 −M 1 M 1 −M 1 −M 0 −M 1 −M 1 M 1 −M 0 −M 1 M 1 −M 1 −M}*(1+j)/sqrt(2)

$EHTS_{-2040}=EHTS_{-1032}=EHTS_{-1016}=EHTS_{-8}=EHTS_8=EHTS_{1016}=EHTS_{1032}=EHTS_{2040}=0$

Max PAPR is 9.0115.

From a PAPR point of view, the proposal in 2.1.2 may be appropriate. From an implementation point of view, the method of 2.1.4, which repeats 11ax 80 MHz phase rotation and multiplies the high frequency 160 MHz or secondary 160 part by −1, may be advantageous. Alternatively, it may be advantageous in implementation to simply repeat 11ax 1600 MHz phase rotation.

Above, a 2×EHT-STF sequence in a contiguous 320 MHz situation is proposed. In non-contiguous 160+160 MHz, the same can be applied using the above sequence. That is, a sequence corresponding to low 160 MHz among 2×EHT-STF sequences in contiguous 320 MHz can be applied to low 160 MHz or primary 160 MHz among non-contiguous 160+160 MHz, and a sequence corresponding to high 160 MHz among the 2×EHTSTF sequences in contiguous 320 MHz may be applied to high 160 MHz or secondary 160 MHz among non-contiguous 160+160 MHz. For example, considering the sequence proposed in 2.1.4, the sequence in non-contiguous 160+160 MHz can be expressed as follows.

Contiguous 320 MHz $EHTS_{-2040:8:2040}$={M −1 M −1 −M −1 M 0 −M 1 M 1 −M 1 −M 0 M −1 M −1 −M −1 M 0 −M 1 M 1 −M 1 −M 0 −M 1 M 1 −M 0 M −1 −M −1 M −1 M 0 −M 1 M 1 −M 0 M −1 −M −1 M −1 M}*(1+j)/sqrt(2)

$EHTS_{-2040}=EHTS_{-1032}=EHTS_{-1016}=EHTS_{-8}=EHTS_8=EHTS_{1016}=EHTS_{1032}=EHTS_{2040}=0$

Non-contiguous 160+160 MHz

Low 160 MHz or primary 160 MHz $EHTS_{-1016:81016}$={M −1 M −1 −M −1 M 0 −M 1 M 1 −M 1 −M 0 M −1 M −1 −M −1 M 0 −M 1 M 1 −M 1 −M}*(1+j)/sqrt(2)

$EHTS_{-1016}=EHTS_{-8}=EHTS_8=EHTS_{1016}=0$

High 160 MHz or secondary 160 MHz $EHTS_{-1016:81016}$={−M −1 M 1 −M 0 M −1 −M −1 M −1 M 0 −M 1 −M 1 M 1 −M 0 M −1 −M −1 M −1 M}*(1+j)/sqrt(2)

$EHTS_{-1016}=EHTS_{-8}=EHTS_8=EHTS_{1016}=0$

As another example, considering the sequence proposed in 2.1.9, the sequence in non-contiguous 160+160 MHz can be expressed as follows.

$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 −M −1 −M −1 M 0 −M 1 M 1 −M 1 −M 0 −M 1 −M 1 M 1 −M 0 −M 1 M 1 −M 1 −M}*(1+j)/sqrt(2)

$EHTS_{-2040}=EHTS_{-1032}=EHTS_{-1016}=EHTS_{-8}=EHTS_8=EHTS_{1016}=EHTS_{1032}=EHTS_{2040}=0$

Non-contiguous 160+160 MHz

Low 160 MHz or primary 160 MHz $EHTS_{-1016:81016}$={M −1 M −1 −M −1 M 0 −M 1 M 1 −M 1 −M 0 −M 1 −M 1 M 1 −M 0 −M 1 M 1 −M 1 −M}*(1+j)/sqrt(2)

$EHTS_{-1016}=EHTS_{-8}=EHTS_8=EHTS_{1016}=0$

High 160 MHz or secondary 160 MHz $EHTS_{-1016:81016}$={M −1 M −1 −M −1 M 0 −M 1 M 1 −M 1 −M 0 −M 1 −M 1 M 1 −M 0 −M 1 M 1 −M 1 −M}*(1+j)/sqrt(2)

$EHTS_{-1016}=EHTS_{-8}=EHTS_8=EHTS_{1016}=0$ 2.2. 240 MHz 2×EHT-STF Sequence

A 2×EHT-STF sequence can be proposed for 240/160+80/80+160 MHz except for the punctured 80 MHz 2×EHT-STF part among the 2×EHT-STFs proposed in 320 MHz above.

2.2.1. 320 MHz 2×EHT-STF puncturing

For example, it may be assumed that the following 320 MHz 2×EHT-STF sequence is used.

$EHTS_{-2040:8:2040}$={M −1 M −1 −M −1 M 0 −M 1 M 1 −M 1 −M 0 M −1 M −1 −M −1 M 0 −M 1 M 1 −M 1 −M 0 −M 1 M 1 −M 0 M −1 −M −1 M −1 M 0 −M 1 −M 1 M 1 −M}*(1+j)/sqrt(2)

$EHTS_{-2040}=EHTS_{4032}=EHTS_{-1016}=EHTS_{-8}=EHTS_8=EHTS_{1016}=EHTS_{1032}=EHTS_{2040}=0$

In this case, when the first 80 MHz is punctured, the 240 MHz 2×EHT-STF sequence as shown below can be used.

$EHTS_{-1528:8:1528}$={M −1 M −1 −M −1 M 0 −M 1 M 1 −M 1 −M 0 −M 1 −M 1 M 1 −M 0 M −1 −M −1 M −1 M 1 −M 0 M −1 −M −1 M −1 M}*(1+j)/sqrt(2)

$EHTS_{-1528}=EHTS_{-520}=EHTS_{-504}=EHTS_{504}=EHTS_{520}=EHTS_{1528}=0$

When the second 80 MHz is punctured, the following 240 MHz 2×EHT-STF sequence can be used.

$EHTS_{-1528:8:1528}$={M −1 M −1 −M −1 M 0 −M 1 M 1 −M 1 −M 0 −M 1 −M 1 M 1 −M 0 M −1 −M −1 M 1 −M 0 M −1 −M −1 M −1 M}*(1+j)/sqrt(2)

$EHTS_{-1528}=EHTS_{-520}=EHTS_{-504}=EHTS_{504}=EHTS_{520}=EHTS_{1528}=0$

When the third 80 MHz is punctured, the following 240 MHz 2×EHT-STF sequence can be used.

$EHTS_{-1528:8:1528}$={M −1 M −1 −M −1 M 0 −M 1 M 1 −M 1 −M 0 M −1 M −1 −M −1 M 0 −M 1 M 1 −M 1 −M 0 M −1 −M −1 M −1 M}*(1+j)/sqrt(2)

$EHTS_{-1528}=EHTS_{-520}=EHTS_{-504}=EHTS_{504}=EHTS_{520}=EHTS_{1528}=0$

When the fourth 80 MHz is punctured, the following 240 MHz 2×EHT-STF sequence can be used.

$EHTS_{-1528:8:1528} = \{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ M\ -1\ -M\ -1\ M\ -1\ M\}*(1+j)/sqrt(2)$
$EHTS_{-1528} = EHTS_{-520} =$
$EHTS_{-504} = EHTS_{504} = EHTS_{520} = EHTS_{1528} = 0$ As another example, suppose that the following 320 MHz 2×EHTSTF sequence is used.

$EHTS_{-2040:8:2040} = \{M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ -M\ 1\ M\ 1\ -M\ 0\ -M\ 1\ M\ 1\ -M\ 1\ M\ 1\ -M\ 0\ -M\ 1\ M\ 1\ -M\ 1\ -M\}*(1+j)/sqrt(2)$
$EHTS_{-2040} = EHTS_{-1032} = EHTS_{-1016} =$
$EHTS_{-8} = EHTS_{8} = EHTS_{1016} = EHTS_{1032} = EHTS_{2040} = 0$ In this case, when the first 80 MHz is punctured, the 240 MHz 2×EHT-STF sequence as shown below can be used.

$EHTS_{-1528:8:1528} = \{-M\ 1\ -M\ 1\ M\ 1\ -M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ -M\ 1\ M\ 1\ -M\ 1\ -M\}*(1+j)\ 1\ sqrt(2)$
$EHTS_{-1528} = EHTS_{-520} =$
$EHTS_{-504} = EHTS_{504} = EHTS_{520} = EHTS_{1528} = 0$ When the second 80 MHz is punctured, the following 240 MHz 2×EHT-STF sequence can be used.

$EHTS_{-1528:8:1528} = \{M\ -1\ M\ -1\ -M\ -1\ M\ 0\ -M\ 1\ M\ 1\ -M\ 1\ -M\ 0\ -M\ 1\ M\ -1\ -M\ -1\ M\ 0\ -M\ 1\ M\ 1\ -M\ 1\ -M\ 0\ -M\ 1\ M\ 1\ -M\ 0\ -M\ 1\ M\ 1\ -M\ 1\ -M\}*(1+j)/sqrt(2)$
$EHTS_{-1528} = EHTS_{-520} =$
$EHTS_{-504} = EHTS_{504} = EHTS_{520} = EHTS_{1528} = 0$ When the third 80 MHz is punctured, the following 240 MHz 2×EHT-STF sequence can be used.

$EHTS_{-1528:8:1528} = \{M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ -M\ 1\ M\ 1\ -M\ 1\ -M\ 0\ -M\ 1\ -M\ 1\ M\ 1\ -M\ 0\ -M\ 1\ M\ 1\ -M\ 1\ -M\}*(1+j)/sqrt(2)$
$EHTS_{-1528} = EHTS_{-520} =$
$EHTS_{-504} = EHTS_{504} = EHTS_{520} = EHTS_{1528} = 0$ When the fourth 80 MHz is punctured, the following 240 MHz 2×EHT-STF sequence can be used.

$EHTS_{-1528:8:1528} = \{M\ -1\ M\ -1\ -M\ -1\ M\ 0\ -M\ 1\ M\ 1\ -M\ 1\ -M\ 0\ -M\ 1\ -M\ 1\ M\ 1\ -M0\ -M\ 1\ M\ 1\ -M\ 1\ -M\ 0\ M\ -1\ M\ -1\ -M\ -1\ M\ 0\ -M\ 1\ M\ 1\ -M\ 1\ -M\}*(1+j)/sqrt(2)$
$EHTS_{-1528} = EHTS_{-520} =$
$EHTS_{-504} = EHTS_{504} = EHTS_{520} = EHTS_{1528} = 0$ In addition, a method of simply repeating the 80 MHz 2×HE-STF sequence of the existing 802.11ax and a sequence that repeats the 80 MHz 2×HE-STF sequence of the existing 802.11ax and lowers PAPR by applying additional phase rotation in units of 20/40/80 MHz to other channels except for the primary channel (or 80 MHz channel with a relatively low frequency) are proposed.

2.2.2. Repetition of 80 MHz 2×HE-STF sequence

A 2×EHT-STF sequence can be configured by repeating the 80 MHz 2×STF sequence three times, and an example is as follows:

$EHTS_{-1528:8:1528} = \{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\}*(1+j)/sqrt(2)$
$EHTS_{-1528} = EHTS_{-520} =$
$EHTS_{-504} = EHTS_{504} = EHTS_{520} = EHTS_{1528} = 0$
Max PAPR is 9.6339.

2.2.3. Repetition 80 MHz 2×HE-STF sequence and additional phase rotation in units of 20 MHz in secondary channel (or channel except for 80 MHz channel with lowest frequency)

$EHTS_{-1528:8:1528} = \{M\ -1\ M\ -1\ -M\ -1\ M\ 0\ -M\ 1\ M\ 1\ -M\ 1\ -M\ 0\ M\ -1\ M\ -1\ -M\ 1\ M\ 0\ -M\ 1\ M\ -1\ -M\ 1\ M\ 0\ M\ -1\ -M\ 1\ -M\ 1\ -M\}*(1+j)/sqrt(2)$ Among all the above sequences, the coefficient below is replaced with 0.

$EHTS_{-1528} = EHTS_{-520} =$
$EHTS_{-504} = EHTS_{504} = EHTS_{520} = EHTS_{1528} = 0$
Max PAPR is 7.6361.

2.2.4. Repetition of 80 MHz 2×HE-STF sequence and additional phase rotation in 40 MHz units in secondary channel (or channel except for 80 MHz channel with lowest frequency)

$EHTS_{-1528:8:1528} = \{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ -M\ 1\ M\ 1\ -M\ 0\ M\ -1\ -M\ -1\ M\ -1\ M\}*(1+j)/sqrt(2)$
or
$EHTS_{-1528:8:1528} = \{M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ M\ -1\ -M\ -1\ M\ -1\ M\}*(1+j)/sqrt(2)$ Among all the above sequences, the coefficient below is replaced with 0.

$EHTS_{-1528} = EHTS_{-520} =$
$EHTS_{-504} = EHTS_{504} = EHTS_{520} = EHTS_{1528} = 0$
Max PAPR is 8.7809.

As in this embodiment (2.2.4), it can be seen that the PAPR of the 2×EHT-STF sequence obtained by repeating the 80 MHz 2×HE-STF sequence and considering additional phase rotation is lower than the PAPR of the 2×EHT-STF sequence obtained by simply repeating the 80 MHz 2×HE-STF sequence as in the previous embodiment (2.2.2). Accordingly, there is an effect that the efficiency of the subcarrier and the effective AGC can be estimated.

In addition, in the proposed 2×EHT-STF sequence, there is no problem in terms of PAPR even if a specific coefficient other than 0 is set for elements with tone indexes of −504, +504, −520, +520, −1528, and +1528. However, there may be performance loss because power is loaded on tones that do not need to be loaded from the viewpoint of transmission power, not from the PAPR side. In particular, when a specific coefficient other than 0 is loaded in DC, a problem such as a DC offset may occur, which may cause signal distortion. That is, by setting the elements having the tone index of −504, +504, −520, +520, −1528, and +1528 to 0, there is an effect that the problem of performance loss during AGC operation in the receiving STA can be solved.

2.2.5. Repetition of 80 MHz 2×HE-STF sequence and additional phase rotation in 80 MHz units in secondary channel (or channel except for 80 MHz channel with lowest frequency)

$EHTS_{-1528:8:1528} = \{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ M\ -1\ -M\ -1\ M\ -1\ M\}*(1+j)/sqrt(2)$
Or
$EHTS_{-1528:8:1528} = \{M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ M\ -1\ -M\ -1\ M\ -1\ M\}*(1+j)/sqrt(2)$ Among all the above sequences, the coefficient below is replaced with 0.

$EHTS_{-1528} = EHTS_{-520} =$
$EHTS_{-504} = EHTS_{504} = EHTS_{520} = EHTS_{1528} = 0$
Max PAPR is 8.7809.

When the 240 MHz 2×EHT-STF sequence is configured by puncturing 320 MHz to configure 240 MHz, the method of 2.2.1 may be preferred, and it may be possible to obtain an implementation gain with the 2×EHT-STF sequence unified with 320 MHz. Also, considering PAPR and various RF capability situations, the method of 2.2.3 may be preferred, but implementation overhead may increase. Implementationally, the more advantageous 2.2.5 method (a form in which all parts except for the primary 80 MHz or the lowest frequency 80 MHz are multiplied by −1) may be advantageous.

Above, a 2×EHT-STF sequence in a contiguous 240 MHz situation is proposed. In non-contiguous 160+80 MHz, the above sequence can be applied in the same way. That is, the sequence corresponding to low 80/160 MHz among the 2×EHT-STF sequences in contiguous 240 MHz can be applied to low 80/160 MHz or primary 80/160 MHz among non-contiguous 160+80 MHz, and a sequence corresponding to high 160/80 MHz among the 2×EHT-STF sequences in contiguous 240 MHz may be applied to high 160/80 MHz of non-contiguous 160+80 MHz or the other 160/80 MHz. For example, considering the sequence proposed in 2.2.5, the sequence in non-contiguous 160+80 MHz can be expressed as follows.

Contiguous 240 MHz $EHTS_{-1528:8:1528}$={M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2)

$EHTS_{-1528}=EHTS_{-520}=EHTS_{-504}=EHTS_{504}=EHTS_{520}=EHTS_{1528}=0$

Non-contiguous 160+80 MHz (when 160 MHz is located at low frequency and 80 MHz is located at high frequency, or when primary 160 MHz is continuous)

Low 160 MHz or primary 160 MHz $EHTS_{-1016:8:1016}$={M −1 M −1 −M −1 M 0 −M 1 M 1 −M 1 −M 0 −M 1 −M 1 M 1 −M 0 M −1 −M −1 M −1 M}*(1+j)/sqrt(2)

$EHTS_{1016}=EHTS_{-8}=EHTS_{8}=EHTS_{1016}=0$

High 80 MHz or the other 80 MHz $EHTS_{-504:5:504}$={−M 1 −M 1 M 1 −M 0 M −1 −M −1 M −1 M}*(1+j)/sqrt(2)

$EHTS_{-504}=EHTS_{504}=0$

Non-contiguous 160+80 MHz (when 80 MHz is located at low frequency and 160 MHz is located at high frequency, or when only primary 80 MHz is continuous)

Low 80 MHz or primary 80 MHz $EHTS_{-504:5:504}$={M −1 M −1 −M −1 M 0 −M 1 M 1 −M}*(1+j)/sqrt(2)

$EHTS_{-504}=EHTS_{504}=0$

High 160 MHz or the other 160 MHz $EHTS_{-1016:8:1016}$={−M 1 −M 1 M 1 −M 0 M −1 −M −1 M −1 M 0 −M 1 −M 1 M 1 −M 0 M −1 −M −1 M −1 M}*(1+j)/sqrt(2)

$EHTS_{1016}=EHTS_{-8}=EHTS_{8}=EHTS_{1016}=0$

In addition, the present specification also proposes a 2×EHT-STF sequence that minimizes maximum PAPR in a situation in which a preamble puncturing pattern and full bandwidth allocation (i.e., non-preamble puncturing) are also considered.

The following shows non-preamble puncturing and preamble puncturing considered at 320 MHz.

Full band allocation: [OOOO OOOO OOOO OOOO]
Preamble Puncturing
[XXOO OOOO OOOO OOOO]
[XX OOOO OOOO OOOO]
[XXOO OOOO OOOO]
[OOXX OOOO OOOO]
[OOOO XXOO OOOO]
[OOOO OOXX OOOO]
[OOOO OOOO XXOO]
[OOOO OOOO OOXX]
[XXXX OOOO OOOO OOOO]
[XXXX OOOO OOOO]
[OOOO XXXX OOOO]
[OOOO OOOO XXXX]

In the above, O or X means that a specific 20 MHz channel is not punctured or punctured, and is expressed in order from a low frequency 20 MHz channel to a high 20 MHz channel.

In addition, the following shows non-preamble puncturing and preamble puncturing considered at 240 MHz.

Full band allocation: [OOOO OOOO OOOO]
Preamble Puncturing
[XXOO OOOO OOOO]
[OOXX OOOO OOOO]
[XXOO OOOO]
[OOXX OOOO]
[OOOO XXOO]
[OOOO OOXX]
[XXXX OOOO OOOO]
[XXXX OOOO]
[OOOO XXXX]

The preamble puncturing pattern may be indicated by the Punctured Channel Information field of the U-SIG (U-SIG-2). The Punctured Channel Information field consists of 5 bits.

Specifically, when the PPDU is transmitted in the non-OFDMA method, 5 bits of the Punctured Channel Information field may be set as items in the table below to signal the non-OFDMA puncturing pattern of the entire PPDU bandwidth. The table below defines the preamble puncturing pattern in the non-OFDMA scheme for each PPDU bandwidth. A value not defined in the Punctured Channel Information field is valid.

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |

As another example, when the PPDU is transmitted in the OFDMA method, first, if the bandwidth is determined as 80/160/320 MHz based on the BW (bandwidth) field of U-SIG-1, a bitmap consisting of 4 bits in the Punctured Channel Information field (The last 1 bit can be ignored) may indicate whether to puncture a 20 MHz channel for each 80 MHz segment. In the 4-bit bitmap, in the order of the lowest bit to the highest bit, the channel may be applied from the lowest frequency 20 MHz channel to the highest frequency 20 MHz channel. When each bit of the 4-bit bitmap indicates 0, the corresponding 20 MHz channel is punctured, and when each bit of the 4-bit bitmap indicates 1, the corresponding 20 MHz channel is not punctured. The allowed puncturing patterns for the 80 MHz segment are: 0111, 1011, 1101, 1110, 0011, 1100 and 1001. Other field values are valid in addition to the above allowed puncturing patterns. The field value for the puncturing pattern may be different for different 80 MHz.

In the following proposal, PAPR means the largest PAPR value among several RUs and RU combinations and preamble puncturing patterns. In addition, the sequence is optimized from the perspective of PAPR, and bandwidth is considered only for contiguous situations when calculating PAPR, but the proposed sequence can be applied to non-contiguous situations as it is.

2.3. 320 MHz 1×EHTSTF Sequence

This embodiment proposes a sequence that simply repeats the existing 80 MHz 2×HESTF sequence and a sequence that repeats the existing 80 MHz 2×HESTF sequence and lowers PAPR by applying additional phase rotation in units of 20/40/80 MHz to other channels except for the primary channel (or 80 MHz channel with a relatively low frequency). In addition, this embodiment proposes a sequence that simply repeats the existing 160 MHz 2×HESTF sequence and a sequence that repeats this and lowers PAPR by applying additional phase rotation in units of 20/40/80 MHz to the secondary 160 MHz channel (or a 160 MHz channel with a relatively high frequency). For reference, all PAPRs below are calculated when 4 times IFFT is applied, and the unit is dB.

2.3.1. Repetition of the 80 MHz 2×HESTF Sequence

The 2×EHTSTF sequence can be constructed by repeating the existing 80 MHz 1×HESTF sequence four times and is as follows.

$EHTS_{-2040:8:2040} = \{M -1 M -1 -M -1 M 0 -M 1 M 1 -M 1 -M 0 M -1 M -1 -M -1 M 0 -M 1 M 1 -M 1 -M 0 M -1 M -1 -M -1 M 0 -M 1 M 1 -M 1 -M 0 M -1 M -1 -M -1 M 0 -M 1 M 1 -M 1 -M\}*(1+j)/sqrt(2)$ $EHTS_{-2040} = EHTS_{-1032} = EHTS_{-1016} = EHTS_{-8} = EHTS_8 = EHTS_{1016} = EHTS_{1032} = EHTS_{2040} = 0$ Max PAPR is 10.8833.

2.3.2. Repetition of the 80 MHz 2×HESTF sequence and additional phase rotation in 20 MHz units in the secondary channel (or the channel except for the 80 MHz channel with the lowest frequency)

$EHTS_{-2040:8:2040} = \{M -1 M -1 -M -1 M 0 -M 1 M 1 -M 1 -M 0 M -1 M -1 -M -1 M 0 -M 1 M -1 M -1 M 0 -M 1 -M 1 M 1 -M 0 M -1 -M 1 -M 1 -M 0 -M 1 -M 1 M 1 -M 0 -M 1 M -1 M -1 M\}*(1+j)/sqrt(2)$ In the above sequence, the following coefficient is replaced with 0.

$EHTS_{-2040} = EHTS_{-1032} = EHTS_{-1016} = EHTS_{-8} = EHTSs = EHTS_{1016} = EHTS_{1032} = EHTS_{2040} = 0$

Max PAPR is 7.9806.

2.3.3. Repetition of the 80 MHz 2×HESTF sequence and additional phase rotation in 40 MHz units in the secondary channel (or the channel except for the 80 MHz channel with the lowest frequency)

$EHTS_{-2040:8:2040} = \{M -1 M -1 -M -1 M 0 -M 1 M 1 -M 1 -M 0 -M 1 -M 1 M 1 -M 0 M -1 -M -1 M -1 M 0 M -1 -M -1 M -1 -M -1 M 0 M -1 -M -1 M -1 -M -1 M 0 M -1 -M -1 M -1 M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 M -1 -M -1 M -1 M 0 -M 1-M 1 M 1 -M 0 -M 1 M 1 -M 1 -M\}*(1+j)/sqrt(2)$ Among all the above sequences, the coefficient below is replaced with 0.

$EHTS_{-2040} = EHTS_{-1032} = EHTS_{-1016} = EHTS_{-8} = EHTS_8 = EHTS_{1016} = EHTS_{1032} = EHTS_{2040} = 0$

Max PAPR is 8.9154.

2.3.4. Repetition of the 80 MHz 2×HESTF sequence and additional phase rotation in 80 MHz units in the secondary channel (or the channel except for the 80 MHz channel with the lowest frequency)

$EHTS_{-2040:8:2040} = \{M -1 M -1 -M -1 M 0 -M 1 M 1 -M 1 -M 0 M -1 M -1 -M -1 M 0 -M 1 M 1 -M 1 -M 0 -M 1 -M 1 M 1 -M 0 M -1 -M -1 M -1 M 0 -M 1 -M 1 M 1 -M 0 M -1 -M -1 M -1 M\}*(1+j)/sqrt(2)$ $EHTS_{-2040} = EHTS_{-1032} = EHTS_{-1016} = EHTS_{-8} = EHTSs = EHTS_{1016} = EHTS_{1032} = EHTS_{2040} = 0$ Max PAPR is 9.7431.

2.3.5. Repetition of the 160 MHz 2×HESTF Sequence

The 2×EHTSTF sequence can be configured by repeating the existing 160 MHz 2×HESTF sequence twice, and is as follows.

$EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 M 0 -M 1 M 1 -M 1 -M 0 -M 1 -M 1 M 1 -M 0 -M 1 M 1 -M 1 -M\}*(1+j)/sqrt(2)$ Among all the above sequences, the coefficient below is replaced with 0.

$EHTS_{-2040} = EHTS_{-1032} = EHTS_{-1016} = EHTS_{-8} = EHTS_8 = EHTS_{1016} = EHTS_{1032} = EHTS_{2040} = 0$

Max PAPR is 9.0115.

2.3.6. Repetition of the 160 MHz 2×HESTF sequence and additional phase rotation in units of 20 MHz in secondary channel (or 160 MHz channel with relatively high frequency)

$EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 -M -1 M 0 -M 1 M 1 -M 1 -M 0 -M 1 -M -1 -M -1 M 0 M -1 -M 1 -M 1 -M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 M 0 -M 1 M 1 -M 1 -M 0 M -1 M 1 M -1 M -1 M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 M 0 -M 1 M 1 -M 1 -M 0 M -1 -M -1 M -1 -M -1 M 0 M -1 -M 1 -M 1 -M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 M 0 -M 1 -M 1 M 0 -M 1 -M -M -1 M 0 M -1 -M -1 M -1 M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 M -1 M -1 -M 1 M 0 -M 1 M 1 -M 1 -M\}*(1+j)/sqrt(2)$ Or $EHTS_{-2040:8:2040} = \{M -1 M -1 -M -1 M 0 -M 1 M 1 -M 1 -M 0 -M 1 -M 1 M 1 -M 0 -M 1 M 1 -M 1 -M 0 M -1 -M -1 M 0 -M 1 M 1 -M 1 -M 0 M -1 -M -1 M 0 -M 1 -M 1 -M\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 −M 1 −M 1 M 0 −M 1 −M 1 −M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 −M 1 M 1 −M 0 M −1 −M 1 −M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 M 1 −M 0 M −1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 M −1 −M −1 M 0 −M 1 −M 1 M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 M −1 −M −1 M 0 −M 1 −M 1 M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M 1 −M 1 −M 0 M −1 M −1 −M 1 M 0 −M 1 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M −1 M 0 M −1 −M −1 M −1 M 0 −M 1 M 1 −M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M −1 −M 0 M −1 −M 1 −M 1 −M 0 M −1 M −1 −M −1 M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 M 1 −M 0 −M 1 M −1 −M 1 M 0 −M 1 M 1 −M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 −M 1 M 1 −M 1 −M 0 M −1 M 1 −M 0 M −1 −M 1 −M 1 −M 0 M −1 M 1 1 −M 0 M −1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M −1 M 0 −M 1 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M −1 M 0 −M 1 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M 1 −M −1 M 1 −M 1 −M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M 1 M −1 M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 −M 1 −M 1 M 1 −M 0 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M 1 M 0 M −1 −M −1 M −1 M 0 −M 1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 −M 1 M 0 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 −M 1 M 1 −M 0 M −1 −M 1 M$\}*(1+j)/sqrt(2)$ Or $EHTS_{-2040:8:2040} = \{$M −1 M −1 −M −1 M 0 −M 1 M 1 −M 1 −M 0 −M 1 −M 1 M 1 −M 0 M −1 −M 1 −M 1 −M 0 M −1 M 1 1 −M 0 M −1 −M −1 M −1 M 0 −M 1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 M 1 −M 0 M −1 −M 1 −M 1 −M 0 M −1 −M −1 M −1 M 0 −M 1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 M 1 −M 0 M −1 −M 1 −M 1 −M 0 −M 1 M M 1 −M 0 M −1 −M −1 M −1 M$\}*(1+j)/sqrt(2)$ Or $EHTS_{-2040:8:2040} = \{$M −1 M −1 −M −1 M 0 −M 1 M 1 −M 1 −M 0 −M 1 M 1 −M 0 M −1 −M 1 −M 1 −M 0 M −1 −M 1 M 0 M −1 −M −1 M −1 M$\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 M 1 -M 0 M -1 -M -1 M -1 M 0 M -1 -M -1 -M -1 M 0 M -1 -M -1 M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M 1 -M 1 -M 0 -M 1 -M 1 M 1 -M 0 -M 1 M -1 -M 1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M 1 -M 1 -M 0 -M 1 -M 1 -M -1 M 0 -M -1 -M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M 1 -M 1 -M 0 M -1 M 1 1 -M 0 -M 1 M 1 -M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M 1 -M 1 -M 0 M -1 -M -1 -M -1 M 0 -M -1 -M 1 M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M -1 M -1 M 0 M -1 -M 1 M 1 -M 1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M -1 M -1 M 0 M -1 -M -1 M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 -M 1 M -1 -M 1 -M 0 -M 1 -M 1 M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 M -1 -M 1 -M 1 -M 0 -M 1 M -1 M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 M -1 -M 1 -M 1 -M 0 -M 1 M -1 -M -1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 M -1 -M 1 -M 1 -M 0 M -1 -M -1 M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 M -1 -M 1 -M 1 -M 0 M -1 -M -1 -M 1 M 1*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 M 0 M -1 -M -1 -M -1 M 0 -M 1 M 1 -M 1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 M 0 M -1 -M -1 M -1 M 0 -M 1 -M 1 -M -1 -M -1 M 0 -M -1 -M -1 M 1*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 -M 1 -M -1 -M -1 M 0 M -1 -M -1 M -1 M 0 -M 1 -M 1 -M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 0 M -1 M 1 1 -M 0 -M 1 M 1 -M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 1 -M 0 -M 1 M 1 -M 1 -M -1 M 0 -M 1 M 1 -M 1 M 1*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 1 -M 0 -M 1 M 1 -M 1 -M -1 -M -1 M 0 -M 1 -M 1 -M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 1 -M 0 -M 1 M 1 -M 1 -M -1 -M -1 M 0 -M 1 -M 1 -M -1 M 1*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 1 -M 0 -M 1 M 1 -M 1 -M 0 M -1 M 1 -M 1 M -1 -M 1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 M -1 M 1 1 -M 0 -M 1 M 1 -M 1 -M 0 M -1 M 1 -M 0 -M 1 M 1 -M 1 M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 M 1 -M 0 -M 1 M -1 M -1 M 0 -M 1 -M 1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 M 1 -M 0 -M 1 M -1 M -1 M 0 -M 1 -M 1 M -1 -M 1 -M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M 1 M 1 -M 1 -M 0 -M 1 M 1 -M 0 -M 1 M -1 M -1 M 0 -M 1 M -1 M -1 M\}*(1+j)/sqrt(2)$ Or $EHTS_{-2040:8:2040} = \{M-1 M-1 -M-1 M 0 -M 1 M 1 -M 1 -M 0 -M 1 -M 1 M 1 -M 0 -M M 1 M 1 -M 0 -M 1 M -1 M -1 M 0 -M 1 M\}*(1+j)/sqrt(2)$ 1 −M 1 M 1 −M 0 −M 1 M −1 M −1 M 0 M −1 M 1 M 1 −M 0 −M 1 M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M −1 M −1 M 0 M −1 M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 −M 1 M −1 M −1 M 0 M −1 M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 −M 1 M −1 M −1 M 0 M −1 −M 1 −M −1 M 0 −M 1 M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 −M 1 M −1 M −1 M 0 M −1 −M 1 −M 1 M 0 −M 1 M −1 M −1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 −M 1 M −1 M −1 M 0 M −1 −M 1 −M 1 M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M 1 −M 0 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M 1 −M 0 M −1 −M 1 −M 1 −M 0 −M 1 M −1 M −1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M 1 −M 0 M −1 −M 1 −M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 M −1 −M 1 M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 −M 1 M −1 M −1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M −1 M −1 M 0 −M 1 −M 1 M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M −1 M −1 M 0 M −1 −M 1 −M 1 −M 0 −M 1 M −1 M −1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M −1 M −1 M 0 M −1 −M 1 −M 1 −M 0 M −1 −M 1 −M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M −1 M −1 M 0 −M 1 −M 1 M 1 −M 0 −M 1 M −1 M 1 M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M −1 M −1 M 0 M −1 −M 1 −M 1 −M 0 −M 1 M −1 M 1 M 1 −M 0 −M 1 M −1 M 1 −M}*(1+j)/sqrt(2)

Or

EHTS$_{-2040:8:2040}$={M −1 M −1 −M −1 M 0 −M 1 M 1 −M 0 −M 1 −M 1 M 1 −M 0 −M 1 M 1 −M 1 −M 0 −M 1 −M 1 M 1 −M 0 M −1 −M 1 −M −1 M −1 M 0 M −1 −M 1 −M 1 −M 0 M −1 −M 1 M 1 −M 0 −M 1 −M 1 −M}*(1+j)/sqrt(2)

Among all the above sequences, the coefficient below is replaced with 0.

EHTS$_{-2040}$=EHTS$_{-1032}$=EHTS$_{-1016}$=EHTS$_{-8}$=EHTS$_{8}$=EHTS$_{1016}$=EHTS$_{1032}$=EHTS$_{2040}$=0

Max PAPR is 9.0115.

2.3.7. Repetition of the 160 MHz 2×HESTF sequence and additional phase rotation in 40 MHz units in secondary channel (or 160 MHz channel with relatively high frequency)

EHTS$_{-2040:8:2040}$={M −1 M −1 −M −1 M 0 −M 1 M 1 −M 1 −M 0 −M 1 −M 1 M 1 −M 0 −M 1M1 −M 1 −M 0 M −1 M −1 −M −1 M 0 M −1 −M 1 M 1 −M 0 M −1 −M −1 M −1 M 1 M 0 M −1 −M 1 −M 1 M}*(1+j)/sqrt(2)

Or

EHTS$_{-2040:8:2040}$={M −1 M −1 −M −1 M 0 −M 1 M 1 −M 0 −M 1M1 −M 1 M 1 −M 0 −M 1 −M 1 M 1 −M 0 −M 1 M 1 −M 1 −M 0 M −1 M 1 −M 1 −M}*(1+j)/sqrt(2)

Among all the above sequences, the coefficient below is replaced with 0.

EHTS$_{-2040}$=EHTS$_{-1032}$=EHTS$_{-1016}$=EHTS$_{-8}$=EHTS$_{8}$=EHTS$_{1016}$=EHTS$_{1032}$=EHTS$_{2040}$=0

Max PAPR is 9.0115.

2.3.8. Repetition of the 160 MHz 2×HESTF sequence and additional phase rotation in units of 80 MHz in secondary channel (or 160 MHz channel with relatively high frequency)

EHTS$_{-2040:8:2040}$={M −1 M −1 −M −1 M 0 −M 1 M 1 −M 0 −M 1 −M 1 M 1 −M 0 −M 1M1 −M 1 −M 0 M −1 M 1 M 1 −M 0 M −1 −M 1 −M 1 −M}*(1+j)/sqrt(2)

Among all the above sequences, the coefficient below is replaced with 0.

EHTS$_{-2040}$=EHTS$_{-1032}$=EHTS$_{-1016}$=EHTS$_{-8}$=EHTS$_{8}$=EHTS$_{1016}$=EHTS$_{1032}$=EHTS$_{2040}$=0

Max PAPR is 9.1649.

2.3.9. Repetition of the 160 MHz 2×HESTF sequence and additional phase rotation in 160 MHz units in secondary channel (or 160 MHz channel with relatively high frequency)

$EHTS_{-2040:8:2040}$={M −1 M −1 −M −1 M 0 −M 1 M 1 −M 1 −M 0 −M 1 −M 1 M 1 −M 0 −M IMI −M 1 −M 0 −M 1 −M 1 M 1 −M 0 M −1 −M −1 M −1 M 0 M −1 M −1 −M −1 M 0 M −1 −M −1 M −1 M}*(1+j)/sqrt(2)

$EHTS_{-2040}$=$EHTS_{-1032}$=$EHTS_{-1016}$=$EHTS_{-8}$=$EHTS_8$=$EHTS_{1016}$=$EHTS_{1032}$=$EHTS_{2040}$=0

Max PAPR is 9.7066.

From a PAPR perspective, the proposal in 2.3.2 may be appropriate. From an implementation point of view, the method of 2.3.4, which repeats flax 80 MHz phase rotation and multiplies the high frequency 160 MHz or secondary 160 part by −1, may be advantageous. Alternatively, the method of 2.3.8, which repeats flax 160 MHz phase rotation and multiplies the high frequency 80 MHz part of the high frequency 160 MHz or secondary 160 part by −1, may be advantageous.

Above, a 2×EHTSTF sequence in a contiguous 320 MHz situation is proposed. In non-contiguous 160+160 MHz, the same can be applied using the above sequence. That is, a sequence corresponding to low 160 MHz among 2×EHTTSF sequences in contiguous 320 MHz can be applied to low 160 MHz or primary 160 MHz among non-contiguous 160+160 MHz, and a sequence corresponding to high 160 MHz among the 2×EHTSTF sequences in contiguous 320 MHz may be applied to high 160 MHz or secondary 160 MHz among non-contiguous 160+160 MHz. For example, considering the sequence proposed in 2.3.4, the sequence at non-contiguous 160+160 MHz can be expressed as follows.

Contiguous 320 MHz $EHTS_{-2040:8:2040}$={M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2)

$EHTS_{-2040}$=$EHTS_{-1032}$=$EHTS_{-1016}$=$EHTS_{-8}$=$EHTS_8$=$EHTS_{1016}$=$EHTS_{1032}$=$EHTS_{2040}$=0

Non-contiguous 160+160 MHz

Low 160 MHz or primary 160 MHz $EHTS_{-1016:8:1016}$={M −1 M −1 −M −1 M 0 −M 1 M 1 −M 1 −M 0 M −1 M −1 −M −1 M 0 −M 1 M 1 −M 1 −M}*(1+j)/sqrt(2)

$EHTS_{-1016}$=$EHTS_{-8}$=$EHTS_8$=$EHTS_{1016}$=0

High 160 MHz or secondary 160 MHz $EHTS_{-1016:8:1016}$={−M 1 −M 1 M 1 −M 0 M −1 −M −1 M −1 M 0 −M 1 −M 1 M 1 −M 0 M −1 −M −1 M −1 M}*(1+j)/sqrt(2)

$EHTS_{-1016}$=$EHTS_{-8}$=$EHTS_8$=$EHTS_{1016}$=0

As another example, considering the sequence proposed in 4.1.8, the sequence at non-contiguous 160+160 MHz can be expressed as follows.

$EHTS_{-2040:8:2040}$={M −1 M −1 −M −1 M 0 −M 1 M 1 −M 1 −M 0 −M 1 −M 1 M 1 −M 0 −M 1 M 1 −M 0 M −1 M −1 −M −1 M 0 −M 1 M 1 −M 0 M −1 −M −1 M −1 M 0 M −1 −M −1 M −1 M}*(1+j)/sqrt(2)

$EHTS_{-2040}$=$EHTS_{-1032}$=$EHTS_{-1016}$=$EHTS_{-8}$=$EHTS_8$=$EHTS_{1016}$=$EHTS_{1032}$=$EHTS_{2040}$=0

Non-contiguous 160+160 MHz

Low 160 MHz or primary 160 MHz $EHTS_{-1016:8:1016}$={M −1 M −1 −M −1 M 0 −M 1 M 1 −M 1 −M 0 −M 1 −M 1 M 1 −M 0 −M 1 M 1 −M 1 −M}*(1+j)/sqrt(2)

$EHTS_{-1016}$=$EHTS_{-8}$=$EHTS_8$=$EHTS_{1016}$=0

High 160 MHz or secondary 160 MHz $EHTS_{-1016:8:1016}$={M −1 M −1 −M −1 M 0 −M 1 M 1 −M 1 −M 0 M −1 M −1 −M −1 M 0 M −1 −M −1 M −1 M}*(1+j)/sqrt(2)

$EHTS_{-1016}$=$EHTS_{-8}$=$EHTS_8$=$EHTS_{1016}$=0

2.4. 240 MHz 2×EHTSTF Sequence

This embodiment can propose a 2×EHTSTF sequence for 240/160+80/80+160 MHz except for the punctured 80 MHz 2×EHTSTF part among the 2×EHTSTFs proposed in 320 MHz above.

2.2.1. 320 MHz 2×EHTSTF Puncturing

For example, suppose that the following 320 MHz 2×EHTSTF sequence is used.

$EHTS_{-2040:8:2040}$={M −1 M −1 −M −1 M 0 −M 1 M 1 −M 1 −M 0 M −1 M −1 −M −1 M 0 −M 1 M 1 −M 1 −M 0 −M 1 M 1 −M 0 M −1 −M −1 M −1 M 0 −M 1 −M 1 M}*(1+j)/sqrt(2)

$EHTS_{-2040}$=$EHTS_{-1032}$=$EHTS_{-1016}$=$EHTS_{-8}$=$EHTS_8$=$EHTS_{1016}$=$EHTS_{1032}$=$EHTS_{2040}$=0

In this case, if the first 80 MHz is punctured, the following 240 MHz 2×EHTSTF sequence can be used.

$EHTS_{-1528:8:1528}$={M −1 M −1 −M −1 M 0 −M 1 M 1 −M 1 −M 0 −M 1 −M 1 M 1 −M 0 M −1 −M −1 M −1 M 0 −M 1 M 1 −M 0 M −1 −M −1 M −1 M}*(1+j)/sqrt(2)

$EHTS_{-1528}$=$EHTS_{-520}$=$EHTS_{-504}$=$EHTS_{504}$=$EHTS_{520}$=$EHTS_{1528}$=0

If the second 80 MHz is punctured, the following 240 MHz 2×EHTSTF sequence can be used.

$EHTS_{-1528:8:1528}$={M −1 M −1 −M −1 M 0 −M 1 M 1 −M 1 −M 0 −M 1 −M 1 M 1 −M 0 M −1 −M −1 M −1 M 0 −M 1 M 1 −M 0 M −1 −M −1 M −1 M}*(1+j)/sqrt(2)

$EHTS_{-1528}$=$EHTS_{-520}$=$EHTS_{-504}$=$EHTS_{504}$=$EHTS_{520}$=$EHTS_{1528}$=0

If the third 80 MHz is punctured, the following 240 MHz 2×EHTSTF sequence can be used.

$EHTS_{-1528:8:1528}$={M −1 M −1 −M −1 M 0 −M 1 M 1 −M 1 −M 0 M −1 M −1 −M −1 M 0 −M 1 M 1 −M 1 −M 0 M −1 M 1 −M 0 M −1−M −1 M −1 M}*(1+j)/sqrt(2)

$EHTS_{-1528}$=$EHTS_{-520}$=$EHTS_{-504}$=$EHTS_{504}$=$EHTS_{520}$=$EHTS_{1528}$=0

If the fourth 80 MHz is punctured, the following 240 MHz 2×EHTSTF sequence can be used.

$EHTS_{-1528:8:1528}$={M −1 M −1 −M −1 M 0 −M 1 M 1 −M 1 −M 0 M −1 M −1 −M −1 M 0 −M 1 M 1 −M 1 −M 0 M 1 M 1 −M 0 M −1−M −1 M −1 M}*(1+j)/sqrt(2)

$EHTS_{-1528}$=$EHTS_{-520}$=$EHTS_{-504}$=$EHTS_{504}$=$EHTS_{520}$=$EHTS_{1528}$=0

As another example, assume that the following 320 MHz 2×EHTSTF sequence is used.

$EHTS_{-2040:8:2040}$={M −1 M −1 −M −1 M 0 −M 1 M 1 −M 1 −M 0 −M 1 −M 1 M 1 −M 0 −M 1 M 1 −M 1 −M 0 M −1 −M −1 M 0 −M 1 M 1 −M 1 −M 0 M −1−M −1 M 0 −M 1 M 1 −M 1 −M 0 M −1−M −1 M −1 M}*(1+j)/sqrt(2)

$EHTS_{-2040}$=$EHTS_{-1032}$=$EHTS_{-1016}$=$EHTS_{-8}$=$EHTS_8$=$EHTS_{1016}$=$EHTS_{1032}$=$EHTS_{2040}$=0

In this case, if the first 80 MHz is punctured, the following 240 MHz 2×EHTSTF sequence can be used.

$EHTS_{-1528:8:1528}$={−M 1 −M 1 M 1 −M 0 −M 1 −M 1 M 1 −M 0 M −1 M −1 −M −1 M 0 M −1 M −1 −M −1 M 0 M −1−M −1 M 0 M −1−M −1 M −1 M}*(1+j)/sqrt(2)

$EHTS_{-1528}$=$EHTS_{-520}$=$EHTS_{-504}$=$EHTS_{504}$=$EHTS_{520}$=$EHTS_{1528}$=0

If the second 80 MHz is punctured, the following 240 MHz 2×EHTSTF sequence can be used.

$EHTS_{-1528:8:1528}$={M −1 M −1 −M −1 M 0 −M 1 M 1 −M 1 −M 0 M −1 M −1 −M −1 M 0 −M 1 M 1 −M 1 −M 0 M −1 −M −1 M 0 M −1 −M −1 M −1 M}*(1+j)/sqrt(2)

$EHTS_{-1528}=EHTS_{-520}=$
$EHTS_{-504}=EHTS_{504}=EHTS_{520}=EHTS_{1528}=0$

If the third 80 MHz is punctured, the following 240 MHz 2×EHTSTF sequence can be used.

$EHTS_{-1528:8:1528}=\{M -1 M -1 -M -1 M 0 -M 1 M 1 -M 1 -M 0 -M 1 -M 1 M 1 -M 0 -M 1 M 1 -M 1 -M 0 M -1 M -1 -M -1 M 0 M -1 -M -1 M -1 M\}*(1+j)/sqrt(2)$ $EHTS_{-1528}=EHTS_{-520}=$
$EHTS_{-504}=EHTS_{504}=EHTS_{520}=EHTS_{1528}=0$ If the fourth 80 MHz is punctured, the following 240 MHz 2×EHTSTF sequence can be used.

$EHTS_{-1528:8:1528}=\{M -1 M -1 -M -1 M 0 -M 1 M 1 -M 1 -M 0 -M 1 -M 1 M 1 -M 0 -M 1 M 1 -M 1 -M 0 M -1 M -1 -M -1 M 0 -M 1 M 1 -M 1 -M\}*(1+j)/sqrt(2)$ $EHTS_{-1528}=EHTS_{-520}=$
$EHTS_{-504}=EHTS_{504}=EHTS_{520}=EHTS_{1528}=0$ Additionally, this embodiment proposes a method of simply repeating the existing 80 MHz 2×HESTF sequence and a sequence that lowers PAPR by repeating the above existing 80 MHz 2×HESTF sequence and applying additional phase rotation in units of 20/40/80 MHz to other channels except for the primary channel (or 80 MHz channel with a relatively low frequency).

2.4.2. Repetition of the 80 MHz 2×HESTF sequence

The 2×EHTSTF sequence can be constructed by repeating the existing 80 MHz 2×HESTF sequence three times and is as follows.

$EHTS_{-1528:8:1528}=\{M -1 M -1 -M -1 M 0 -M 1 M 1 -M 1 -M 0 M -1 M -1 -M -1 M 0 -M 1 M 1 -M 1 -M 0 M -1 M -1 -M -1 M 0 -M 1 M 1 -M 1 -M\}*(1+j)/sqrt(2)$ $EHTS_{-1528}=EHTS_{-520}=$
$EHTS_{-504}=EHTS_{504}=EHTS_{520}=EHTS_{1528}=0$ Max PAPR is 9.6339.

2.4.3. Repetition of the 80 MHz 2×HESTF sequence and additional phase rotation in 20 MHz units in the secondary channel (or the channel except for the 80 MHz channel with the lowest frequency)

$EHTS_{-1528:8:1528}=\{M -1 M -1 -M -1 M 0 -M 1 M 1 -M 1 -M 0 M -1 M -1 -M -1 M 0 -M 1 M -1 M -1 M 0 -M\]1 -M 1 M 1 -M 0 M -1 -M 1 -M 1 -M\}*(1+j)/sqrt(2)$ Or $EHTS_{-1528:8:1528}=\{M -1 M -1 -M -1 M 0 -M 1 M 1 -M 1 -M 0 M -1 M -1 -M -1 M 0 M -1 -M 1 -M 1 -M0 -M 1 -M 1 M 1 -M 0 M -1 -M 1 -M 1 -M\}*(1+j)/sqrt(2)$ Among all the above sequences, the coefficient below is replaced with 0.

$EHTS_{-1528}=EHTS_{-520}=$
$EHTS_{-504}=EHTS_{504}=EHTS_{520}=EHTS_{1528}=0$

Max PAPR is 8.0381.

2.4.4. Repetition of the 80 MHz 2×HESTF sequence and additional phase rotation in 40 MHz units in the secondary channel (or the channel except for the 80 MHz channel with the lowest frequency)

$EHTS_{-1528:8:1528}=\{M -1 M -1 -M -1 M 0 -M 1 M 1 -M 1 -M 0 M -1 M -1 -M -1 M 0 -M 1 M 1 -M 1 -M 0 M 1 -M 1 M 1 -M 0 M -1 -M 1 M -1 M\}*(1+j)/sqrt(2)$ Or $EHTS_{-1528:8:1528}=\{M -1 M -1 -M -1 M 0 -M 1 M 1 -M 1 -M 0 -M 1 -M 1 M 1 -M 0 M -1 -M -1 M -1 M 0 -M 1 -M 1 M 1 -M 0 M -1 -M -1 M -1 M\}*(1+j)/sqrt(2)$ Among all the above sequences, the coefficient below is replaced with 0.

$EHTS_{-1528}=EHTS_{-520}=$
$EHTS_{-504}=EHTS_{504}=EHTS_{520}=EHTS_{1528}=0$

Max PAPR is 8.9149.

2.4.5. Repetition of the 80 MHz 2×HESTF sequence and additional phase rotation in 80 MHz units in the secondary channel (or the channel except for the 80 MHz channel with the lowest frequency)

$EHTS_{-1528:8:1528}=\{M -1 M -1 -M -1 M 0 -M 1 M 1 -M 1 -M 0 M -1 M -1 -M -1 M 0 -M 1 M 1 -M 1 -M 0 -M 1 -M 1 M 1 -M 0 M -1 -M -1 M -1 M\}*(1+j)/sqrt(2)$ or $EHTS_{-1528:8:1528}=\{M -1 M -1 -M -1 M 0 -M 1 M 1 -M 1 -M 0 -M 1 -M 1 M 1 -M 0 M -1 -M -1 M -1 M 0 -M 1 -M 1 M 1 -M 0 M -1 -M -1 M -1 M\}*(1+j)/sqrt(2)$ Among all the above sequences, the coefficient below is replaced with 0.

$EHTS_{-1528}=EHTS_{-520}=$
$EHTS_{-504}=EHTS_{504}=EHTS_{520}=EHTS_{1528}=0$

Max PAPR is 8.9149.

In the case of configuring 240 MHz by puncturing 320 MHz for the 240 MHz 2×EHTTSF sequence, the method of 2.4.1 may be preferred, and implementation gains may be obtained with the 2×EHTTSF sequence unified with 320 MHz. Also, considering PAPR and various RF capability situations, the method of 2.4.3 may be preferred, but implementation overhead may increase. Implementationally, the 2.4.5 method (a form in which all parts except for the primary 80 or 80 MHz of the lowest frequency are multiplied by −) may be advantageous.

Above, a 2×EHTTSF sequence in a contiguous 240 MHz situation is proposed. In non-contiguous 160+80 MHz, the above sequence can be applied in the same way. That is, a sequence corresponding to low 80/160 MHz among 2×EHTTSF sequences in contiguous 240 MHz can be applied to low 80/160 MHz or primary 80/160 MHz among non-contiguous 160+80 MHz, and a sequence corresponding to high 160/80 MHz among the 1×EHTTSF sequences in contiguous 240 MHz may be applied to high 160/80 MHz of non-contiguous 160+80 MHz or the other 160/80 MHz. For example, considering the sequence proposed in 2.4.5, the sequence at non-contiguous 160+80 MHz can be expressed as follows.

Contiguous 240 MHz $EHTS_{-1528:8:1528}=\{M -1 M -1 -M -1 M 0 -M 1 M 1 -M 1 -M 0 -M 1 -M 1 M 1 -M 0 M -1 -M -1 M -1 M 0 -M 1 M 1 -M 0 M -1 -M -1 M -1 M\}*(1+j)/sqrt(2)$ $EHTS_{-1528}=EHTS_{-520}=$
$EHTS_{-504}=EHTS_{504}=EHTS_{520}=EHTS_{1528}=0$ Non-contiguous 160+80 MHz (when 160 MHz is located at low frequency and 80 MHz is located at high frequency, or when primary 160 MHz is continuous)

Low 160 MHz or primary 160 MHz $EHTS_{-1016:81016}=\{M -1 M -1 -M -1 M 0 -M 1 M 1 -M 1 -M 0 -M 1 -M 1 M 1 -M 0 M -1 -M -1 M -1 M\}*(1+j)/sqrt(2)$ $EHTS_{-1016}=EHTS_{-8}=EHTS_{8}=EHTS_{1016}=0$ High 80 MHz or the other 80 MHz $EHTS_{-504:5:504}=\{-M 1 -M 1 M 1 -M 0 M -1 -M 1 -1 M\}*(1+j)/sqrt(2)$ $EHTS_{-504}=EHTS_{504}=0$ Non-contiguous 160+80 MHz (when 80 MHz is located at low frequency and 160 MHz is located at high frequency, or when only primary 80 MHz is continuous)

Low 80 MHz or primary 80 MHz $EHTS_{-504:5:504}=\{M -1 M -1 -M -1 M 0 -M 1 M 1 -M 1 -M\}*(1+j)/sqrt(2)$ $EHTS_{-504}=EHTS_{504}=0$ High 160 MHz or the other 160 MHz $EHTS_{-1016:8:1016}=\{-M\ 1\ -M\ 1\ M\ 1\ -M\ 0\ M\ -1\ -M\ -1\ M\ -1\ M\ 0\ -M\ 1\ -M\ 1\ M\ 1\ -M\ 0\ M\ -1\ -M\ -1\ M\ -1\ M\}*(1+j)/sqrt(2)$ $EHTS_{-1016}=EHTS_{-8}=EHTS_{8}=EHTS_{1016}=0$ As another example, suppose that the following 240 MHz 2×EHTSTF sequence is used.

Contiguous 240 MHz $EHTS_{-1528:8:1528}=\{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\ 0\ -M\ 1\ -M\ 1\ M\ 1\ -M\ 0\ M\ -1\ -M\ -1\ M\ -1\ M\}*(1+j)/sqrt(2)$ $EHTS_{-1528}=EHTS_{-520}=EHTS_{-504}=EHTS_{504}=EHTS_{520}=EHTS_{1528}=0$ Non-contiguous 160+80 MHz (when 160 MHz is located at low frequency and 80 MHz is located at high frequency, or when primary 160 MHz is continuous)

Low 160 MHz or primary 160 MHz $EHTS_{-1016:8:1016}=\{M\ -1\ M\ -1\ -M\ -1\ M\ 0\ -M\ 1\ M\ 1\ -M\ 1\ -M\ 0\ M\ -1\ M\ -1\ -M\ -1\ M\ 0\ -M\ 1\ M\ 1\ -M\ 1\ -M\}*(1+j)/sqrt(2)$ $EHTS_{-1016}=EHTS_{-8}=EHTS_{8}=EHTS_{1016}=0$ High 80 MHz or the other 80 MHz $EHTS_{-504:5:504}=\{-M\ 1\ -M\ 1\ M\ 1\ -M\ 0\ M\ -1\ -M\ -1\ M\ -1\ M\}*(1+j)/sqrt(2)$ $EHTS_{-504}=EHTS_{504}=0$ Non-contiguous 160+80 MHz (when 80 MHz is located at low frequency and 160 MHz is located at high frequency, or when only primary 80 MHz is continuous)

Figure 22:
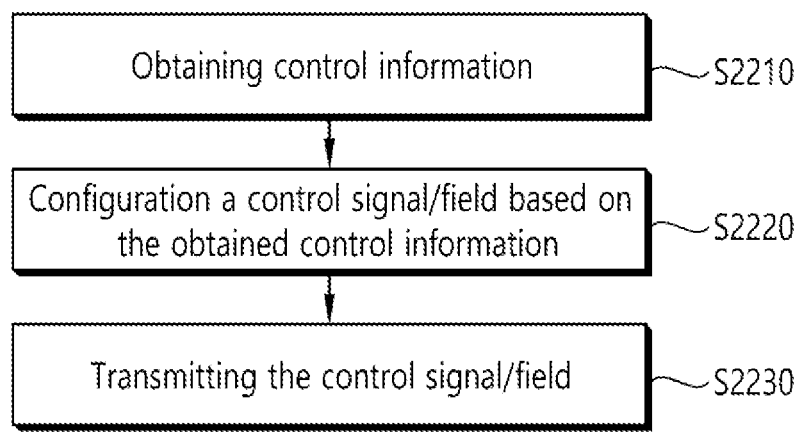
FIG. 22 is a flowchart illustrating the operation of the transmitting apparatus/device according to the present embodiment.

Low 80 MHz or primary 80 MHz $EHTS_{-504:5:504}=\{M\ -1\ M\ -1\ -M\ -1\ M\ 0\ -M\ 1\ M\ 1\ -M\ 1\ -M\}*(1+j)/sqrt(2)$ $EHTS_{-504}=EHTS_{504}=0$ High 160 MHz or the other 160 MHz $EHTS_{-101681016}=\{M\ -1\ M\ -1\ -M\ -1\ M\ -M\ 1\ M\ 1\ -M\ 1\ -M\ 0\ -M\ 1\ -M\ 1\ M\ 1\ -M\ 0\ M\ -1\ -M\ -1\ M\ -1\ M\}*(1+j)/sqrt(2)$ $EHTS_{-1016}=EHTS_{-8}=EHTS_{8}=EHTS_{1016}=0$ FIG. 22 is a flowchart illustrating the operation of the transmitting apparatus/device according to the present embodiment.

The above-described STF sequence (i.e., EHT-STF/EHTS sequence) may be transmitted according to the example of FIG. 22.

The example of FIG. 22 may be performed by a transmitting device (AP and/or non-AP STA).

Some of each step (or detailed sub-step to be described later) of the example of FIG. 22 may be skipped/omitted.

In step S2210, the transmitting device may obtain control information for the STF sequence. For example, the transmitting device may obtain information related to a bandwidth (e.g., 80/160/240/320 MHz) applied to the STF sequence. Additionally/alternatively, the transmitting device may obtain information related to a characteristic applied to the STF sequence (e.g., information indicating generation of a 1×, 2×, or 4× sequence).

In step S2220, the transmitting device may configure or generate a control signal/field (e.g., EHT-STF signal/field) based on the obtained control information (e.g., information related to the bandwidth).

The step S2220 may include a more specific sub-step.

For example, step S2220 may further include selecting one STF sequence from among a plurality of STF sequences based on the control information obtained through the step S2210.

Additionally/alternatively, step S2220 may further include performing a power boosting.

Step S2220 may also be referred to as a step of generating a sequence.

In step S2230, the transmitting device may transmit a signal/field/sequence configured in the step S2220 to the receiving apparatus/device based on the step S2230.

The step S2220 may include a more specific sub-step.

For example, the transmitting apparatus/device may perform a phase rotation step. Specifically, the transmitting apparatus/device may perform the phase rotation step in units of 20 MHz*N (N=integer) for the sequence generated through the step S2220.

Additionally/alternatively, the transmitting apparatus/device may perform at least one of CSD, Spatial Mapping, IDFT/IFFT operation, GI insertion, and the like.

A signal/field/sequence constructed according to the present specification may be transmitted in the form of FIG. 22.

An example of FIG. 22 relates to an example of a transmitting apparatus/device (AP and/or non-AP STA).

As shown in FIG. 1, the transmitting apparatus/device may include a memory 112, a processor 111, and a transceiver 113.

The memory 112 may store information related to a plurality of STF sequences described herein. In addition, it may store control information for generating an STF sequence/PPDU.

The processor 111 may generate various sequences (e.g., STF sequences) based on the information stored in the memory 112 and configure the PPDU. An example of the PPDU generated by the processor 111 may be as shown in FIG. 18.

The processor 111 may perform some of the operations illustrated in FIG. 22. For example, it is possible to obtain control information for generating an STF sequence and configure the STF sequence.

For example, the processor 111 may include an additional sub-unit. A detailed unit included in the processor 111 may be configured as shown in FIG. 19. That is, as shown, the processor 111 may perform operations such as CSD, spatial mapping, IDFT/IFFT operation, and GI insertion.

The illustrated transceiver 113 may include an antenna and may perform analog signal processing. Specifically, the processor 111 may control the transceiver 113 to transmit the PPDU generated by the processor 111.

Figure 23:
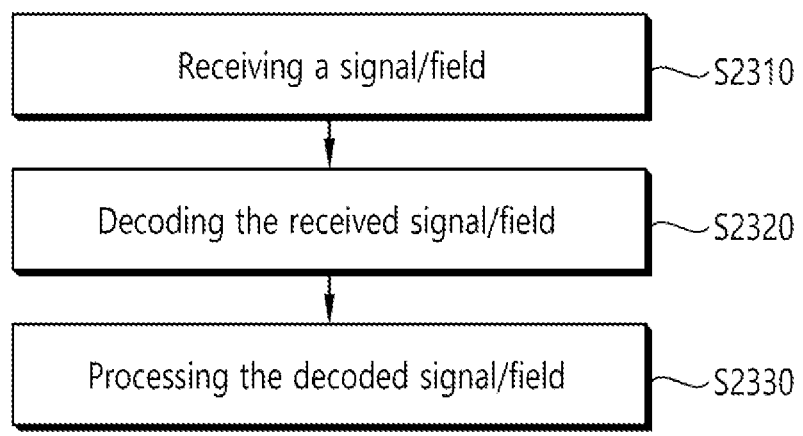
FIG. 23 is a flowchart illustrating the operation of the receiving apparatus/device according to the present embodiment.

FIG. 23 is a flowchart illustrating the operation of the receiving apparatus/device according to the present embodiment.

The above-described STF sequence (i.e., EHT-STF/EHTS sequence) may be transmitted according to the example of FIG. 23.

The example of FIG. 23 may be performed by a receiving apparatus/device (AP and/or non-AP STA).

Some of each step (or detailed sub-step to be described later) of the example of FIG. 23 may be skipped/omitted.

In step S2310, the receiving apparatus/device may receive a signal/field including an STF sequence (i.e., an EHT-STF/EHTS sequence) in step S2310. The received signal may be in the form of FIG. 18.

The sub-step of step S2310 may be determined based on the step S2230. That is, in the step S2310, an operation for restoring the results of the phase rotation CSD, spatial mapping, IDFT/IFFT operation, and GI insert operation applied in step S2230 may be performed.

In step S2310, the STF sequence may perform various functions, such as detecting time/frequency synchronization of a signal or estimating an AGC gain.

In step S2320, the receiving apparatus/device may perform decoding on the received signal based on the STF sequence.

For example, step S2320 may include decoding the data field of the PPDU including the STF sequence. That is, the receiving apparatus/device may decode a signal included in the data field of the successfully received PPDU based on the STF sequence.

In step S2330, the receiving apparatus/device may process the data decoded in step S2320.

For example, the receiving apparatus/device may perform a processing operation of transferring the decoded data to a higher layer (e.g., MAC layer) in step S2320. In addition, when generation of a signal is instructed from the upper layer to the PHY layer in response to data transferred to the upper layer, a subsequent operation may be performed.

The example of FIG. 23 relates to an example of a transmitting apparatus/device (AP and/or non-AP STA).

As shown in FIG. 1, the transmitting apparatus/device may include a memory 112, a processor 111, and a transceiver 113.

The memory 112 may store information related to a plurality of STF sequences described herein. In addition, it may store control information for generating an STF sequence/PPDU.

The processor 111 may generate various sequences (e.g., STF sequences) based on the information stored in the memory 112 and configure the PPDU. An example of the PPDU generated by the processor 111 may be as shown in FIG. 18.

The processor 111 may perform some of the operations illustrated in FIG. 22. For example, it is possible to obtain control information for generating an STF sequence and configure the STF sequence.

For example, the processor 111 may include an additional sub-unit. A detailed unit included in the processor 111 may be configured as shown in FIG. 19. That is, as shown, the processor 111 may perform operations such as CSD, spatial mapping, IDFT/IFFT operation, and GI insertion.

The illustrated transceiver 113 may include an antenna and may perform analog signal processing. Specifically, the processor 111 may control the transceiver 113 to transmit the PPDU generated by the processor 111.

Some technical features shown in FIG. 23 may be implemented by the transceiver 113. The analog RF processing shown in detail may be included in the transceiver 113.

Hereinafter, the above-described embodiment will be described with reference to FIGS. 1 to 23.

Figure 24:
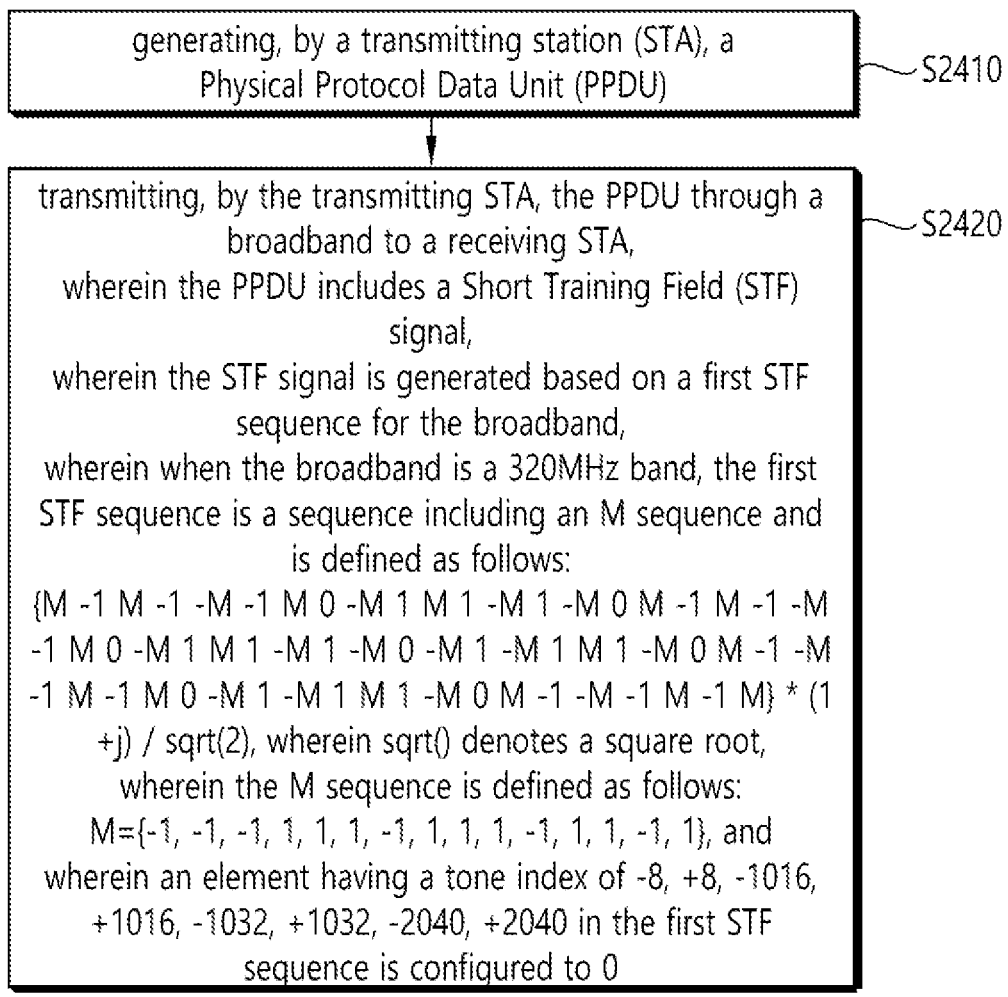
FIG. 24 is a flowchart illustrating a procedure in which a transmitting STA transmits a PPDU according to the present embodiment.

FIG. 24 is a flowchart illustrating a procedure in which a transmitting STA transmits a PPDU according to the present embodiment.

The example of FIG. 24 may be performed in a network environment in which a next-generation wireless LAN system (IEEE 802.11be or EHT wireless LAN system) is supported. The next-generation wireless LAN system is a wireless LAN system improved from the 802.11ax system, and may support backward compatibility with the 802.11ax system.

The example of FIG. 24 is performed by a transmitting STA, and the transmitting STA may correspond to an access point (AP). The receiving STA of FIG. 24 may correspond to an STA supporting an Extremely High Throughput (EHT) WLAN system.

This embodiment proposes a method of configuring a 2×STF sequence mapped to an RU or a multi-RU (MRU) when a TB PPDU is transmitted through a wideband (240 MHz or 320 MHz).

In step S2410, the transmitting STA generates a PPDU (Physical Protocol Data Unit).

In step S2420, the transmitting STA transmits the PPDU to the receiving STA through a broadband.

The PPDU includes a Short Training Field (STF) signal. The STF signal is generated based on a first STF sequence for the broadband.

When the broadband is a 320 MHz band, the first STF sequence is a sequence including an M sequence and is defined as follows.

{M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2)

In the case, sqrt( ) denotes a square root.

The M sequence is defined as follows. The M sequence is the same as an M sequence defined in the 802.11ax wireless LAN system.

M={−1, −1, −1, 1, 1, 1, −1, 1, 1, 1, −1, 1, 1, −1, 1}

The first STF sequence may be arranged at intervals of 8 tones from the lowest tone having a tone index of −2040 to the highest tone having a tone index of +2040. In this case, an element having a tone index of −8, +8, −1016, +1016, −1032, +1032, −2040, +2040 in the first STF sequence is configured to 0.

The first STF sequence is a sequence in which a phase rotation is applied to a sequence in which the second STF sequence is repeated. The second STF sequence is an STF sequence for the 80 MHz band defined in the 802.11ax wireless LAN system. The second STF sequence may be defined as follows.

{M −1 M −1 −M −1 M 0 −M 1 M 1 −M 1 −M}*(1+j)/sqrt(2)

That is, the first STF sequence may be obtained using a 2×HE-STF sequence for the 80 MHz band defined in the existing 802.11ax.

The broadband may include first to fourth 80 MHz bands. The first to fourth 80 MHz bands may be arranged in order from a low frequency to a high frequency. The phase rotation may be applied to the second, third, or fourth 80 MHz band in the broadband. That is, the phase rotation may be applied to the remaining 80 MHz band except for the first 80 MHz band having the lowest frequency.

For example, the first STF sequence may be obtained by applying the phase rotation (multiplied by −1) to the 80 MHz channel with the highest frequency (the fourth 80 MHz band) and the 80 MHz channel with the second highest frequency (the third 80 MHz band) in a sequence in which the second STF sequence is repeated 4 times.

The PPDU may be a trigger based (TB) PPDU. That is, the PPDU may be a PPDU triggered by a trigger frame.

The PPDU may be received through a resource unit (RU) or a multi-RU (MRU). The RU or the MRU may include a combination of 26-tone RU, 52-tone RU, 106-tone RU, 242-tone RU, 484-tone RU, 996-tone RU, 26+52-tone RU, 242+484-tone RU, 2×996-tone RU, 484+996-tone RU, 3×996-tone RU, or 4×996-tone RU. When the broadband is the 320 MHz band, the broadband may include 148 26-tone RUs, 64 52-tone RUs, 32 106-tone RUs, 16 242-tone RUs, 8 484-tone RUs, 4 996-tone RUs, 16 26+52-tone RUs, 16 242+484-tone RUs, 2 2×996-tone RUs, 8 484+996-tone RUs, 4 3×996-tone RUs, or one 4×996-tone RU.

At this time, the 26+52-tone RU may be an MRU in which a 26-tone RU and a 52-tone RU are aggregated, the 242+484-tone RU may be an MRU in which a 242-tone RU and a 484-tone RU are aggregated, the 484+996-tone RU may be an MRU in which a 484-tone RU and a 996-tone RU are aggregated, the 2×996-tone RU may be an MRU in which two 996-tone RUs are aggregated, the 3×996-tone RU may be an MRU in which three 996-tone RUs are aggregated, and the 4×996-tone RU may be an MRU in which four 996-tone RUs are aggregated.

In addition, the first STF sequence may be mapped to frequency tones as follows. The first STF sequence may be arranged at intervals of 8 tones from the lowest tone having a tone index of −2040 to the highest tone having a tone index of +2040. That is, each element of the first STF sequence may be mapped one by one to a frequency tone having the tone index.

However, the first STF sequence may be mapped to tones included in the RU or the MRU. That is, the first STF sequence may be mapped only to the tones included in the RU or the MRU allocated by the trigger frame based on the tone index of the first STF sequence. For example, when three 996-tone RUs are allocated by the trigger frame, the first STF sequence is not mapped to the other 996-tone RU.

The STF signal may be used for automatic gain control (AGC) estimation in multiple input multiple output (MIMO) transmission.

The PPDU may include a legacy field, a control field, and a data field. In this case, the STF signal may be included in the control field. The control field and the data field may support an 802.11be wireless LAN system.

Specifically, the legacy field may include a Legacy-Short Training Field (L-STF), a Legacy-Long Training Field (L-LTF), a Legacy-Signal (L-SIG) and a Repeated L-SIG (RL-SIG). The control field may include a Universal-Signal (U-SIG), an Extremely High Throughput-Signal (EHT-SIG), an EHT-STF, and an EHT-LTF. The STF signal may be included in the EHT-STF.

In addition, in the STF sequence for the 240 MHz/160+80 MHz/80+160 MHz band may be determined as a sequence in which puncturing (80 MHz-based preamble puncturing) is performed for 80 MHz in the STF sequence (first STF sequence) for the 320 MHz/160+160 MHz bands described above. That is, the STF sequence for the 240 MHz/160+80 MHz/80+160 MHz band is not separately defined, and the STF sequence can be obtained using the STF sequence for the 320 MHz/160+160 MHz band (unified technique/scheme).

For example, the STF sequence (first STF sequence) for the 320 MHz/160+160 MHz band may be defined as {M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2), and thus the STF sequence for the 240 MHz/160+80 MHz/80+160 MHz band may be determined according to the punctured 80 MHz band.

When the first 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2).

When the second 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2).

When the third 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 M −1 M −1 −M −1 M 0 −M 1 M 1 −M 1 −M 0 M −1 −M −1 M −1 M}*(1+j)/sqrt(2).

When the fourth 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 M −1 M −1 −M −1 M 0 −M 1 M 1 −M 1 −M 0 −M 1 M 1 −M 0 M −1 −M −1 M −1 M}*(1+j)/sqrt(2).

Figure 25:
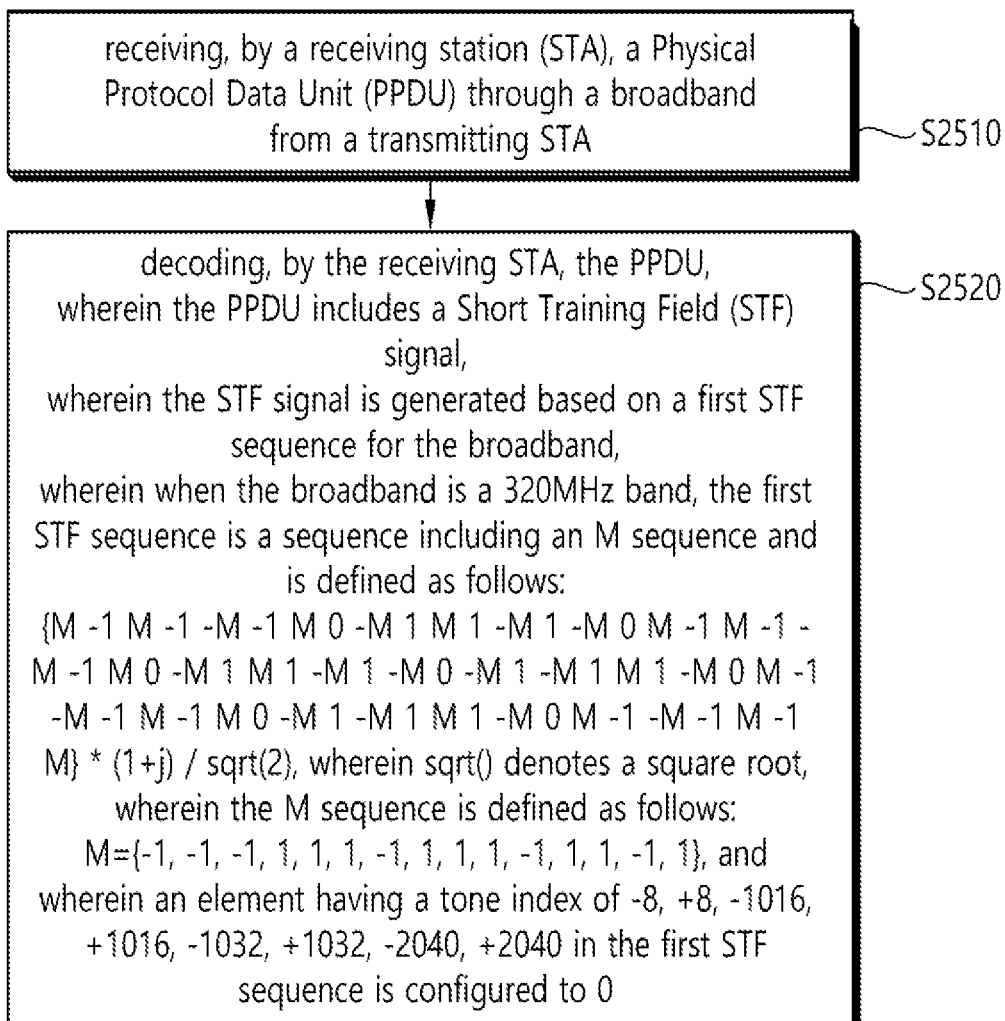
FIG. 25 is a flowchart illustrating a procedure in which a receiving STA receives a PPDU according to the present embodiment.

FIG. 25 is a flowchart illustrating a procedure in which a receiving STA receives a PPDU according to the present embodiment.

The example of FIG. 25 may be performed in a network environment in which a next-generation wireless LAN system (IEEE 802.11be or EHT wireless LAN system) is supported. The next-generation wireless LAN system is a wireless LAN system improved from the 802.11ax system, and may support backward compatibility with the 802.11ax system.

The example of FIG. 25 is performed by the receiving STA and may correspond to a STA supporting an Extremely High Throughput (EHT) WLAN system. The transmitting STA of FIG. 25 may correspond to an access point (AP).

This embodiment proposes a method of configuring a 2×STF sequence mapped to an RU or a multi-RU (MRU) when a TB PPDU is transmitted through a wideband (240 MHz or 320 MHz).

In step S2510, the receiving station (STA) receives a Physical Protocol Data Unit (PPDU) from the transmitting STA through a broadband.

In step S2520, the receiving STA decodes the PPDU.

The PPDU includes a Short Training Field (STF) signal.

The STF signal is generated based on a first STF sequence for the broadband.

When the broadband is a 320 MHz band, the first STF sequence is a sequence including an M sequence and is defined as follows.

{M −1 M −1 −M −1 M 0 −M 1 M 1 −M 1 −M 0 M −1 M −1 −M −1 M 0 −M 1 M 1 −M 1 −M 0 −M 1 M 1 −M 0 M −1 −M −1 M −1 M 0 −M 1 −M 1 M 1 −M 0 M −1 −M −1 M −1 M}*(1+j)/sqrt(2)

In the case, sqrt( ) denotes a square root.

The M sequence is defined as follows. The M sequence is the same as an M sequence defined in the 802.11ax wireless LAN system.

M={−1, −1, −1, 1, 1, 1, −1, 1, 1, 1, −1, 1, 1, −1, 1}

The first STF sequence may be arranged at intervals of 8 tones from the lowest tone having a tone index of −2040 to the highest tone having a tone index of +2040. In this case, an element having a tone index of −8, +8, −1016, +1016, −1032, +1032, −2040, +2040 in the first STF sequence is configured to 0.

The first STF sequence is a sequence in which a phase rotation is applied to a sequence in which the second STF sequence is repeated. The second STF sequence is an STF sequence for the 80 MHz band defined in the 802.11ax wireless LAN system. The second STF sequence may be defined as follows.

{M −1 M −1 −M −1 M 0 −M 1 M 1 −M 1 −M 1}*(1+j)/sqrt(2)

That is, the first STF sequence may be obtained using a 2×HE-STF sequence for the 80 MHz band defined in the existing 802.11ax.

The broadband may include first to fourth 80 MHz bands. The first to fourth 80 MHz bands may be arranged in order from a low frequency to a high frequency. The phase rotation may be applied to the second, third, or fourth 80 MHz band in the broadband. That is, the phase rotation may be applied to the remaining 80 MHz band except for the first 80 MHz band having the lowest frequency.

For example, the first STF sequence may be obtained by applying the phase rotation (multiplied by −1) to the 80 MHz channel with the highest frequency (the fourth 80 MHz band) and the 80 MHz channel with the second highest frequency (the third 80 MHz band) in a sequence in which the second STF sequence is repeated 4 times.

The PPDU may be a trigger based (TB) PPDU. That is, the PPDU may be a PPDU triggered by a trigger frame.

The PPDU may be received through a resource unit (RU) or a multi-RU (MRU). The RU or the MRU may include a combination of 26-tone RU, 52-tone RU, 106-tone RU, 242-tone RU, 484-tone RU, 996-tone RU, 26+52-tone RU, 242+484-tone RU, 2×996-tone RU, 484+996-tone RU, 3×996-tone RU, or 4×996-tone RU. When the broadband is the 320 MHz band, the broadband may include 148 26-tone RUs, 64 52-tone RUs, 32 106-tone RUs, 16 242-tone RUs, 8 484-tone RUs, 4 996-tone RUs, 16 26+52-tone RUs, 16 242+484-tone RUs, 2 2×996-tone RUs, 8 484+996-tone RUs, 4 3×996-tone RUs, or one 4×996-tone RU.

At this time, the 26+52-tone RU may be an MRU in which a 26-tone RU and a 52-tone RU are aggregated, the 242+484-tone RU may be an MRU in which a 242-tone RU and a 484-tone RU are aggregated, the 484+996-tone RU may be an MRU in which a 484-tone RU and a 996-tone RU are aggregated, the 2×996-tone RU may be an MRU in which two 996-tone RUs are aggregated, the 3×996-tone RU may be an MRU in which three 996-tone RUs are aggregated, and the 4×996-tone RU may be an MRU in which four 996-tone RUs are aggregated.

In addition, the first STF sequence may be mapped to frequency tones as follows. The first STF sequence may be arranged at intervals of 8 tones from the lowest tone having a tone index of −2040 to the highest tone having a tone index of +2040. That is, each element of the first STF sequence may be mapped one by one to a frequency tone having the tone index.

However, the first STF sequence may be mapped to tones included in the RU or the MRU. That is, the first STF sequence may be mapped only to the tones included in the RU or the MRU allocated by the trigger frame based on the tone index of the first STF sequence. For example, when three 996-tone RUs are allocated by the trigger frame, the first STF sequence is not mapped to the other 996-tone RU.

The STF signal may be used for automatic gain control (AGC) estimation in multiple input multiple output (MIMO) transmission.

The PPDU may include a legacy field, a control field, and a data field. In this case, the STF signal may be included in the control field. The control field and the data field may support an 802.11be wireless LAN system.

Specifically, the legacy field may include a Legacy-Short Training Field (L-STF), a Legacy-Long Training Field (L-LTF), a Legacy-Signal (L-SIG) and a Repeated L-SIG (RL-SIG). The control field may include a Universal-Signal (U-SIG), an Extremely High Throughput-Signal (EHT-SIG), an EHT-STF, and an EHT-LTF. The STF signal may be included in the EHT-STF.

In addition, in the STF sequence for the 240 MHz/160+80 MHz/80+160 MHz band may be determined as a sequence in which puncturing (80 MHz-based preamble puncturing) is performed for 80 MHz in the STF sequence (first STF sequence) for the 320 MHz/160+160 MHz bands described above. That is, the STF sequence for the 240 MHz/160+80 MHz/80+160 MHz band is not separately defined, and the STF sequence can be obtained using the STF sequence for the 320 MHz/160+160 MHz band (unified technique/scheme).

For example, the STF sequence (first STF sequence) for the 320 MHz/160+160 MHz band may be defined as {M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M 0 −M 1−M 1 M 1 −M 0 M −1 −M −1 M −1 M}*(1+j)/sqrt(2), and thus the STF sequence for the 240 MHz/160+80 MHz/80+160 MHz band may be determined according to the punctured 80 MHz band.

When the first 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2).

When the second 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt(2).

When the third 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 0 M −1 M −1 −M −1 M 0 −M 1 M 1 −M 1 −M 0 −M 1 −M 1 M 1 −M 0 M −1 −M −1 M −1 M}*(1+j)/sqrt(2).

When the fourth 80 MHz of the 320 MHz/160+160 MHz band is punctured, the STF sequence for the 240 MHz/160+80 MHz/80+160 MHz band may be {M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M}*(1+j)/sqrt(2).

5. Apparatus/Device Configuration

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19 For example, the apparatus of the present specification may receive a Physical Protocol Data Unit (PPDU) from a transmitting STA through a broadband; and decodes the PPDU.

The technical features of the present specification may be implemented based on a CRM (computer readable medium). For example, CRM proposed by the present specification is at least one computer readable medium including at least one computer readable medium including instructions based on being executed by at least one processor.

The CRM may store instruction that perform operations comprising receiving a Physical Protocol Data Unit (PPDU) through a broadband from a transmitting STA; and decoding the PPDU. The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 19. Meanwhile, the CRM of the present specification may be the memory(s) 112 and/or 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a Wireless Local Area Network (WLAN) system, the method comprising:
    receiving, by a receiving station (STA), a Physical Protocol Data Unit (PPDU) through a broadband from a transmitting STA; and
    decoding, by the receiving STA, the PPDU,
    wherein the PPDU includes a Short Training Field (STF) signal,
    wherein the STF signal is generated based on a first STF sequence for the broadband,
    wherein based on the broadband being a 320 MHz band, the first STF sequence is a sequence including an M sequence and is defined as follows:
    {M −1 M −1 −M −1 M 0 −M 1 M 1 −M 1 −M 0 M −1 M −1 −M −1 M 0 −M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt (2), wherein sqrt (2) a square root,
    wherein the M sequence is defined as follows:
    M={−1, −1, −1, 1, 1, 1, −1, 1, 1, 1, −1, 1, 1, −1, 1}, and
    wherein an element having a tone index of −8, +8, −1016, +1016, −1032, +1032, −2040, +2040 in the first STF sequence is configured to 0.

2. The method of claim 1, wherein the PPDU is a trigger based (TB) PPDU,
    wherein the PPDU is received through a resource unit (RU) or a multi-RU (MRU),
    wherein the RU or the MRU includes a combination of 26-tone RU, 52-tone RU, 106-tone RU, 242-tone RU, 484-tone RU, 996-tone RU, 26+52-tone RU, 242+484- tone RU, 2x996-tone RU, 484+996-tone RU, 3x996-tone RU, or 4x996-tone RU,
wherein the 26+52-tone RU is an MRU in which a 26-tone RU and a 52-tone RU are aggregated,
wherein the 242+484-tone RU is an MRU in which a 242-tone RU and a 484-tone RU are aggregated,
wherein the 484+996-tone RU is an MRU in which a 484-tone RU and a 996-tone RU are aggregated,
wherein the 2x996-tone RU is an MRU in which two 996-tone RUs are aggregated,
wherein the 3x996-tone RU is an MRU in which three 996-tone RUs are aggregated,
wherein the 4x996-tone RU is an MRU in which four 996-tone RUs are aggregated.

3. The method of claim 1, wherein the first STF sequence is mapped to tones included in the RU or the MRU.

4. The method of claim 1, wherein the first STF sequence is a sequence in which a phase rotation is applied to a sequence in which a second STF sequence is repeated,
wherein the second STF sequence is an STF sequence for the 80 MHz band defined in the 802.11ax wireless LAN system,
wherein the broadband includes first to fourth 80 MHz bands,
wherein the first to fourth 80 MHz bands are arranged in the order of low frequency to high frequency,
wherein the phase rotation is applied to the second, third or fourth 80 MHz band in the broadband.

5. The method of claim 4, wherein the second STF sequence is defined as follows:
{M −1 M −1 −M −1 M 0 −M 1 M 1 −M 1 −M}*(1+j)/sqrt (2).

6. The method of claim 1, wherein the first STF sequence is arranged at intervals of 8 tones from the lowest tone having a tone index of −2040 to the highest tone having a tone index of +2040.

7. The method of claim 1, wherein the STF signal is used for automatic gain control (AGC) estimation in multiple input multiple output (MIMO) transmission.

8. The method of claim 1, wherein the PPDU includes a legacy field, a control field, and a data field,
wherein the STF signal is included in the control field,
wherein the control field and the data field support 802.11be wireless LAN system.

9. A receiving station (STA) in a Wireless Local Area Network (WLAN) system, the receiving STA comprising:
a memory;
a transceiver; and
a processor operatively coupled to the memory and transceiver,
wherein processor is configured to:
receive a Physical Protocol Data Unit (PPDU) through a broadband from a transmitting STA; and
decode the PPDU,
wherein the PPDU includes a Short Training Field (STF) signal,
wherein the STF signal is generated based on a first STF sequence for the broadband,
wherein based on the broadband being a 320 MHz band, the first STF sequence is a sequence including an M sequence and is defined as follows:
{M −1 M −1 −M −1 M 0 −M 1 M 1 −M 1 −M 0 M −1 M −1 −M −1 M 0−M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt (2), wherein sqrt (2) denotes a square root,
wherein the M sequence is defined as follows:
M={−1, −1, −1, 1, 1, 1, −1, 1, 1, 1, −1, 1, 1, −1, 1}, and wherein an element having a tone index of −8, +8, −1016, +1016, −1032, +1032, −2040, +2040 in the first STF sequence is configured to 0.

10. A method in a Wireless Local Area Network (WLAN) system, the method comprising:
generating, by a transmitting station (STA), a Physical Protocol Data Unit (PPDU); and
transmitting, by the transmitting STA, the PPDU through a broadband to a receiving STA,
wherein the PPDU includes a Short Training Field (STF) signal,
wherein the STF signal is generated based on a first STF sequence for the broadband,
wherein based on the broadband being a 320 MHz band, the first STF sequence is a sequence including an M sequence and is defined as follows:
{M −1 M −1 −M −1 M 0 −M 1 M 1 −M 1 −M 0 M −1 M −1 −M −1 M 0−M 1 M 1 −M 1 −M 0 −M 1 −M 1 M 1 −M 0 M −1 −M −1 M −1 M 0 −M 1 −M 1 M 1 −M 0 M −1 −M −1 M −1 M}*(1+j)/sqrt (2), wherein sqrt (2) denotes a square root,
wherein the M sequence is defined as follows:
M={−1, −1, −1, 1, 1, 1, −1, 1, 1, 1, −1, 1, 1, −1, 1}, and wherein an element having a tone index of −8, +8, −1016, +1016, −1032, +1032, −2040, +2040 in the first STF sequence is configured to 0.

11. The method of claim 10, wherein the PPDU is a trigger based (TB) PPDU,
wherein the PPDU is received through a resource unit (RU) or a multi-RU (MRU),
wherein the RU or the MRU includes a combination of 26-tone RU, 52-tone RU, 106-tone RU, 242-tone RU, 484-tone RU, 996-tone RU, 26+52-tone RU, 242+484-tone RU, 2x996-tone RU, 484+996-tone RU, 3x996-tone RU, or 4x996-tone RU,
wherein the 26+52-tone RU is an MRU in which a 26-tone RU and a 52-tone RU are aggregated,
wherein the 242+484-tone RU is an MRU in which a 242-tone RU and a 484-tone RU are aggregated,
wherein the 484+996-tone RU is an MRU in which a 484-tone RU and a 996-tone RU are aggregated,
wherein the 2x996-tone RU is an MRU in which two 996-tone RUs are aggregated,
wherein the 3x996-tone RU is an MRU in which three 996-tone RUs are aggregated,
wherein the 4x996-tone RU is an MRU in which four 996-tone RUs are aggregated.

12. The method of claim 10, wherein the first STF sequence is mapped to tones included in the RU or the MRU.

13. The method of claim 10, wherein the first STF sequence is a sequence in which a phase rotation is applied to a sequence in which a second STF sequence is repeated,
wherein the second STF sequence is an STF sequence for the 80 MHz band defined in the 802.11ax wireless LAN system,
wherein the broadband includes first to fourth 80 MHz bands,
wherein the first to fourth 80 MHz bands are arranged in the order of low frequency to high frequency,
wherein the phase rotation is applied to the second, third or fourth 80 MHz band in the broadband.

14. The method of claim 13, wherein the second STF sequence is defined as follows:
{M −1 M −1 −M −1 M 0 −M 1 M 1 −M 1 −M}*(1+j)/sqrt(2).

15. The method of claim 10, wherein the first STF sequence is arranged at intervals of 8 tones from the lowest tone having a tone index of −2040 to the highest tone having a tone index of +2040.

* * * * *